United States Patent
Moustafa et al.

(10) Patent No.: US 11,827,792 B2
(45) Date of Patent: *Nov. 28, 2023

(54) WASTEWATER PURIFICATION COMPOSITION FOR ORGANIC DYES

(71) Applicant: Imam Abdulrahman Bin Faisal University, Dammam (SA)

(72) Inventors: Tamer Ezzat Youssef Moustafa, Dammam (SA); Hanan Hussein Amin Mohamed Besisa, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/317,269

(22) Filed: May 15, 2023

(65) Prior Publication Data

US 2023/0279232 A1  Sep. 7, 2023

Related U.S. Application Data

(63) Continuation of application No. 17/957,647, filed on Sep. 30, 2022, now Pat. No. 11,667,793, which is a
(Continued)

(51) Int. Cl.
*C09B 47/04* (2006.01)
*C01G 9/02* (2006.01)
(Continued)

(52) U.S. Cl.
CPC .............. *C09B 47/045* (2013.01); *C01G 9/02* (2013.01); *C02F 1/32* (2013.01); *C09B 47/085* (2013.01);
(Continued)

(58) Field of Classification Search
CPC .................................................. C09B 67/0032
See application file for complete search history.

(56) References Cited

U.S. PATENT DOCUMENTS 9,700,882 B2  7/2017  Ahmed et al.

FOREIGN PATENT DOCUMENTS

| CN | 103134753 A | 6/2013 |
| CN | 107955398 A | 4/2018 |

OTHER PUBLICATIONS

Maya-Trevino, et al.; SYnthesis and photocatalytic activity ZnO—CuPc for methylene blue and potassium cyanide degradation; Materials Science in Semiconductor Processing, vol. 77; pp. 74-82; Apr. 2018; Abstract Only; 2 Pages.

Ghosh, et al.; Structural, Optical, and Electrical Properties of in Situ Synthesized ZnO—CuPc Nanocomposites; The Journal of Physical Chemistry C, 118, 1; pp. 691-699; Dec. 17, 2013; Abstract Only; 2 Pages.

(Continued)

*Primary Examiner* — Alexandre F Ferre
(74) *Attorney, Agent, or Firm* — Oblon, McClelland, Maier & Neustadt, L.L.P.

(57) ABSTRACT

A composite nanomaterial of ZnO impregnated by, e.g., a green copper phthalocyanine compound (CuPc) can be an efficient solar light photocatalyst for water remediation. The composite may include hollow shell microspheres and hollow nanospheres of CuPc-ZnO. CuPc may function as a templating and/or structure modifying agent, e.g., for forming hollow microspheres and/or nanospheres of ZnO particles. The composite can photocatalyze the degradation of organic pollutants such as crystal violet (CV) and 2,4-dichlorophenoxyacetic acid as well as microbes in water under solar light irradiation. The ZnO—CuPc composite can be stable and recyclable under solar irradiation.

7 Claims, 21 Drawing Sheets

Related U.S. Application Data continuation of application No. 16/569,155, filed on Sep. 12, 2019, now Pat. No. 11,485,862.

(51) Int. Cl.

| | | |
|---|---|---|
| *C02F 1/32* | (2023.01) | |
| *C09B 47/08* | (2006.01) | |
| *H01B 1/00* | (2006.01) | |
| C02F 101/30 | (2006.01) | |
| B82Y 30/00 | (2011.01) | |
| C09B 67/00 | (2006.01) | |

(52) U.S. Cl.
CPC ............... *H01B 1/00* (2013.01); *B82Y 30/00* (2013.01); *C01P 2002/70* (2013.01); *C01P 2002/82* (2013.01); *C01P 2002/84* (2013.01); *C01P 2004/32* (2013.01); *C01P 2004/64* (2013.01); *C02F 2101/308* (2013.01); *C02F 2305/10* (2013.01); *C09B 67/0032* (2013.01)

(56) References Cited

OTHER PUBLICATIONS

Sharma, et al. ; Charge generation and photovoltaic properties of hybrid solar cells based on ZnO and copper phthalocyanines (CuPc) ; Solar Energy Materials and Solar Cells, vol. 90, Issue 1-5 ; pp. 933-943 ; May 5, 2006 ; Abstract Only ; 2 Pages.

Luo, et al. ; Electrodeposition of zinc oxide/tetrasulfonated copper phtalocyanine hybrid thin film for dye-sensitized solar cell application ; Applied Surface Science, vol. 257, issue 15 ; pp. 6908-6911 ; May 15, 2011 ; Abstract Only ; 2 Pages.

Izaki, et al. ; Hybrid zinc oxide:Cu-phthalocyanine bulkheterojunction photovoltaic device†; RSC Advances 4 ; Mar. 12, 2014 ; 6 Pages.

Seddigi, et al. ; Ultrafast dynamics at the zinc phthalocyanine/zincoxide nanohybrid interface for efficient solar light harvesting in the near red region ; Solar Energy Materials & Solar Cells 143 ; pp. 63-71 ; Jun. 12, 2015 ; 9 Pages.

Mohamed, et al. ; Highly efficient Cu-phthalocyanine-sensitized ZnO hollow spheres for photocatalytic and antimicrobial applications ; Composites Part B 176 ; 2019 ; 9 Pages.

WASTEWATER PURIFICATION COMPOSITION FOR ORGANIC DYES

CROSS-REFERENCE TO RELATED APPLICATIONS

The present application is a Continuation of U.S. application Ser. No. 17/957,647, now allowed, having a filing date of Sep. 30, 2022, which is a Continuation of U.S. application Ser. No. 16/569,155, now U.S. Pat. No. 11,485,862, having a filing date of Sep. 12, 2019.

STATEMENT OF PRIOR DISCLOSURE

Aspects of the present disclosure are described in Hanan H. Mohamed, Ines Hammami, Sultan Akhtar, Tamer E. Youssef, "Highly efficient Cu-phthalocyanine-sensitized ZnO hollow spheres for photocatalytic and antimicrobial applications," Composites Part B: Engineering, Volume 176, 2019, 107314, https://doi.org/10.1016/j.compositesb.2019.107314, which published online on Aug. 13, 2019 and is incorporated herein by reference.

BACKGROUND OF THE INVENTION

Field of the Invention

The present disclosure relates to metallophthalocyanine composites with metal oxides, particularly including copper-phthalocyanine and/or zinc oxide, methods of making such composites, and to the use of such composites in decomposing organic compounds, particularly organic dyes, in water and/or modifying ZnO morphology with one or more metallophthalocyanines.

Description of the Related Art

With growing populations, water pollution has correspondingly become a worldwide issue, with roughly 14,000 people dying each day due to water pollution. Water pollution not only affects the environment and human well-being, but also disrupts the balance of the ecosystem. Many factors can cause water pollution such as herbicides, pesticides, toxic metal ions, and pathogens. Therefore, treating wastewater before its release back into the environment is crucial.

Organic dyes are an important synthetic component of hazardous water pollutants. Several methods have been used in the art to treat wastewater containing organic dyes, including electrochemical oxidation techniques using metal plates, adsorption methods, and photocatalytic methods. Photocatalysis using semiconductor nanomaterials has gained attention as a cost effective, green, and efficient method for decomposing various organic and inorganic pollutants.

When a semiconductor nanomaterials is irradiated UV or visible light with at least the same energy as the band gap energy, electron-hole pairs ($e^-/h^+$) are generated in the conduction band and the valence band of the semiconductor, respectively. The photogenerated charge carriers, i.e., electrons and holes, then migrate to the surface of the semiconductor nanoparticle and potentially become efficient reducing or oxidizing species.

Different semiconductor nanomaterials have been used for photocatalytic oxidation and reduction processes, including $TiO_2$, ZnO, CdO, CdS, ZnS, etc. Among the various known semiconductor nanomaterials, zinc oxide (ZnO), particularly as a nanomaterial, has become a widely investigated metal oxide semiconductor as a suitable material for widespread environmental and energy applications due to its distinctive characteristics including environmental tolerability, photocatalytic activity, low cost, and biocompatibility. However, ZnO has the disadvantage that it is susceptible to two dissolution processes during the heterogeneous photocatalysis. The first dissolution process is chemical dissolution with species in solution and the second dissolution process is the photochemical dissolution, where the photogenerated holes can oxidize the ZnO. In addition, the photocatalytic activity of ZnO is limited by a high rate of charge carrier recombination and limited visible light absorption.

Several approaches have been attempted at decreasing the dissolution rate of ZnO nanoparticles, including surface and morphology modifications. Other approaches have focused on extending the absorption range of ZnO nanomaterials, for example, by metal/non-metal doping, metal loading, coupling with other semiconductor, hybridization with carbon nanomaterials such as graphene oxide (GO), and dye sensitization. Amongst these methods, photosensitizing ZnO nanomaterials with organometallic dyes has shown potential as an efficient and convenient method.

Recently, ZnO sensitized with cobalt-phthalocyanine indicated efficient visible light photocatalysis for cyanide degradation. ZnO nanorod sensitized with nickel phthalocyanine also exhibited photocatalytic activity for Rhodamine B transformation. Photocatalytic degradation of Rhodamine 6G has also been achieved using zinc phthalocyanine in the presence of ZnO. Other efforts in the art are known.

CN 103134753 A by Li et al. (M. Li) discloses a zinc oxide composite material modified by copper phthalocyanine, its synthesis and use. M. Li's materials are zinc oxide microporous blocks with surfaces modified by copper phthalocyanines, having specific surface areas of 8 to 9 $m^2/g$, a microporous block length of 5 to 10 µm, a microporous block height of 10 to 20 µm, and a pore diameter in each microporous block of 20 to 70 nm. M. Li does not disclose a copper phthalocyanine-zinc oxide composite comprising optionally hollow micro-spheres having average diameters of from 0.5 to 5.0 m and optionally hollow nano-spheres having average diameters of from 50 to 450 nm.

U.S. Pat. No. 9,700,882 to Ahmed et al. (Ahmed) discloses zinc-based nanohybrids having zinc oxide nanostructures connected to zinc phthalocyanine molecules via biologically important ligands. Ahmed's nanohybrid has photocatalytic properties and photodegrades water pollutants, such as methyl orange. Ahmed's material may be a nanoparticle, with an average diameter of 50 to 100 nm, and/or a nontubular nanorod, with an average largest diameter of 50 to 100 nm and a length of 0.3 to 5 µm. Ahmed requires a bridging compound such as a terminal dicarboxylic acid or amino acid, but does not disclose using copper.

CN 107955398 A by Li et al. (Q. Li) discloses a composite pigment with the surface coated with phthalocyanine blue. Q. Li's method uses electrostatic interaction of copper phthalocyanine (CuPc) with opposite charges and a laminar oxyhydrate nano-material with a similar hydrotalcite structure to directly co-assemble to obtain a laminar nano composite material. Q. Li's structure has CuPc molecules and a laminar oxyhydrate layer are in monomolecular layer vertical arrangement, with an increased interlayer spacing of laminar oxyhydrate. While Q. Li uses $ZnCl_2$—alongside $AlCl_3$ and $MgCl_2$—in its process with CuPc, Q. Li's process is sonicated for up to 2 hours, then treated at a pH of at least 10 for at least 8 hours, to obtain a surface coated blue phthalocyanine composite. Q. Li does describe the morphology of its product.

Mater. Sci. Semicond. Proc. 2017, 77, 74-82 by Maya-Trevino et al. (Maya) discloses ZnO modified with 0.1 and 0.5 wt. % copper (II) phthalocyanine (CuPc) synthesized via a sol-gel method. Maya's ZnO—CuPc material can degrade methylene blue and KCN under 290 to 390 nm and 400 to 700 nm light sources. Maya does not use a hydrothermal synthesis, and produces nanosized particles of customary bar morphology that tend to agglomerate.

J. Phys. Chem. C 2014, 118(1), 691-699 by Ghosh et al. (Ghosh) discloses nanocomposites of copper phthalocyanine (CuPc) and ZnO nanoparticles grown in situ in a colloidal solution of CuPc using zinc acetate as precursor and NaOh as precipitating agent. Ghosh forms a network of n-type ZnO with p-type CuPc, with ZnO nanorods firmly attached to the CuPc in the composite. Ghosh does not describe nano- or micro-spheres, hollow or otherwise, nor biocidal activity.

Solar Energy Mater. Solar Cells 2006, 90(7-8), 933-943 by Sharma et al. (Sharma) discloses a blend of p-type copper phthalocyanine (CuPc) and n-type zinc oxide (ZnO) nanoparticle, describing an efficient electron transfer between donor (CuPc) and acceptor (ZnO) nanoparticle in a composite thin film structure. Sharma also describes that the capacitance-voltage characteristics of the ZnO—CuPc device support the formation of a bulk heterojunction between CuPc and ZnO nanoparticles, but does not disclose spheroid morphologies, nor antiseptic activity.

Appl. Surf Sci. 2011, 257(15), 6908-6911 by Luo et al. (Luo) discloses hybrid film of zinc oxide (ZnO) and tetrasulfonated copper phthalocyanine (TSPcCu) grown on an indium tin oxide (ITO) glass by a one-step cathodic electrodeposition from aqueous mixtures of $Zn(NO_3)_2$, TSPcCu, and KCl. Luo reports that adding TSPcCu influences the morphology and crystallographic orientation of ZnO, and describes a nanosheet stack of ZnO with a porous surface structure advantageous for adsorbing organic dyes. Luo does not disclose a spheroid morphology for its materials, much less a hollow nano-sphere morphology, especially for a copper phthalocyanine-zinc oxide composite.

In light of the above, a need remains for composite materials comprising phthalocyanine, copper, and zinc oxide, particularly having spheroid morphology and more particularly with hollow spherical shapes, particularly for decomposing organic contamination in water, such as organic dyes, pharmaceuticals, and the like, and methods of making and using such composites.

SUMMARY OF THE INVENTION

Aspects of the invention provide composite materials, comprising: a copper phthalocyanine compound; and ZnO, wherein the composite material comprises first spheroid particles having an average diameter in a range of from 50 to 450 nm and second spheroid particles of an average outer diameter in a range of from 0.5 to 5 μm. Such materials may be modified by any permutation of the features described herein, particularly the following.

The copper phthalocyanine compound may have a structure of a formula

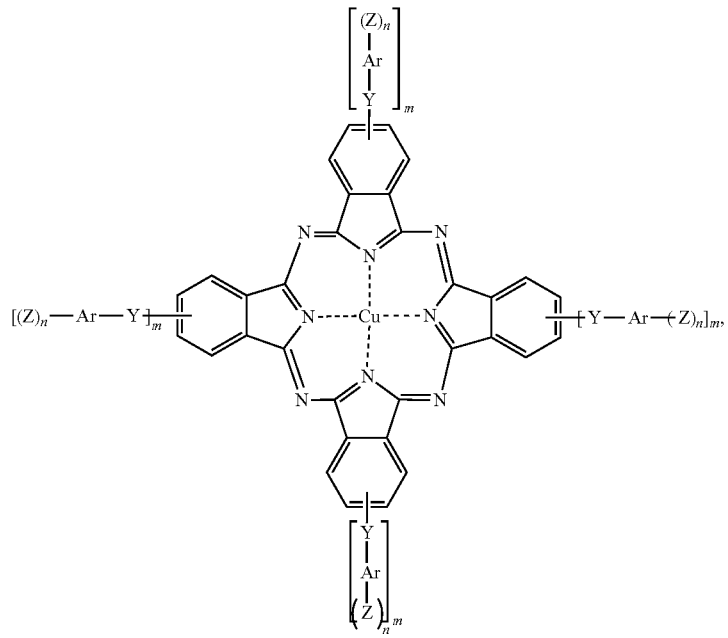

wherein Ar is an aryl group, Y is independently O or S, Z is independently a sulfonate, phosphonate, or carboxylate, m is independently 0 or 1, and n is independently 0, 1, or 2. The aryl group may be phenyl, naphthyl, biphenyl, pyridyl, pyrrole, thiophene, pyrazole, imidazole, 1,2,4-triazole, 1,2,3-triazole, oxazole, isoxazole, isothiazole, thiazole, pyrimidine, pyridazine, pyrazine, 1,2,4-triazine, 1,3,5-triazine, indole, isoindole, indolizine, indazole, benzimidazole, 7-azaindole, 4-azaindole, 5-azaindole, 6-azaindole, 7-azaindazole, pyrazolo[1,5-a]pyrimidine, purine, benzofuran, isobenzofuran, benzo[c]thiophene, benzo[b]thiophene, benzo[d]isoxazole, benzo[c]isoxazole, benzo[d]isothiazole, benzo[c]isothiazole, benzo[d]oxazole, benzo[d]thiazole, benzo[c][1,2,5]thiadiazole, adenine, quinoline, isoquinoline, 4-quinolizine, quinoxaline, phthalazine, quinazoline, cinnoline, 1,8-napthtyridine, pyrido[3,2-d]pyrimidine, pyrido[4, 3-d]pyrimidine, pyrido[3,4-b]pyrazine, pyrido[2,3-b]pyrazine, pteridine, acridine, or phenazine. The copper phthalocyanine compound may be one in which Ar is phenyl, Y is S, Z is sulfonate, m is 1, and/or n is independently 0 or 1.

The copper phthalocyanine compound may be present in an amount of from 2.5 to 15 wt. %, relative to a total material weight.

Inventive materials may be synthesized hydrothermally.

Inventive materials may have a molar ratio of Cu to Zn in a range of from 3:1 to 1:3.

The first spheroids may have a sphericity of at least 0.85. The second spheroids may comprise hollow spheres have a sphericity of at least 0.9 and/or hollow hemispheres, which when extrapolated to spheres, may have a sphericity of at least 0.9. The second spheroids, particularly including hollow hemispheres and/or spheres, may have nanorods, protruding outwardly, orthogonally to spherical surfaces, and the nanorods may have an average diameter in a range of from 1 to 250 nm.

Aspects of the invention provide methods of synthesizing a composite including hollow micro(hemi)spheres and/or nanospheres, which methods may comprise: combining a zinc compound and a copper phthalocyanine compound in a solvent to form a reaction mixture; and heating the reaction mixture at a temperature in a range of 100 to 200° C. for a treatment time in a range of 10 to 30 hours, wherein a molar ratio of the zinc compound to the copper phthalocyanine compound is in a range 3:1 to 1:3.

The copper phthalocyanine compound may comprise at least 75 wt. % of sulfonated tetra thiophenyl copper phthalocyanine.

The solvent may comprise at least 75 wt. %, relative to total solvent weight, of a mixture of ethanol and diethylene glycol.

The zinc compound may comprise at least 75 wt. %, relative to total zinc salt weight, of zinc acetonylacetonate.

The heating may be conducted at a pressure in a range of from greater than 1 to 50 atm.

The hollow micro(hemi)spheres may have a diameter in a range of from 0.5 to 5.0 μm, and/or wherein the hollow nanospheres may have a diameter in a range of from 50 to 450 nm.

Aspects of the invention provide methods of decomposing one or more organic compounds in water, which methods may comprise: contacting any permutation of the inventive composite material(s) as described herein with an aqueous medium comprising the organic compound to form a mixture; and irradiating the mixture with ultraviolet and/or visible light. The mixture may further comprise 0.05 to 0.4 wt. % hydrogen peroxide. The organic compound may comprise an organic dye.

Aspects of the invention provide methods for treating water, which may comprise: irradiating a mixture comprising an aqueous fluid comprising a first amount of bacteria with any permutation of the inventive composite material(s) as described herein, with ultraviolet and/or visible light to obtain a treated aqueous fluid comprising a second amount of bacteria, wherein the first amount is greater than the second amount of bacteria.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
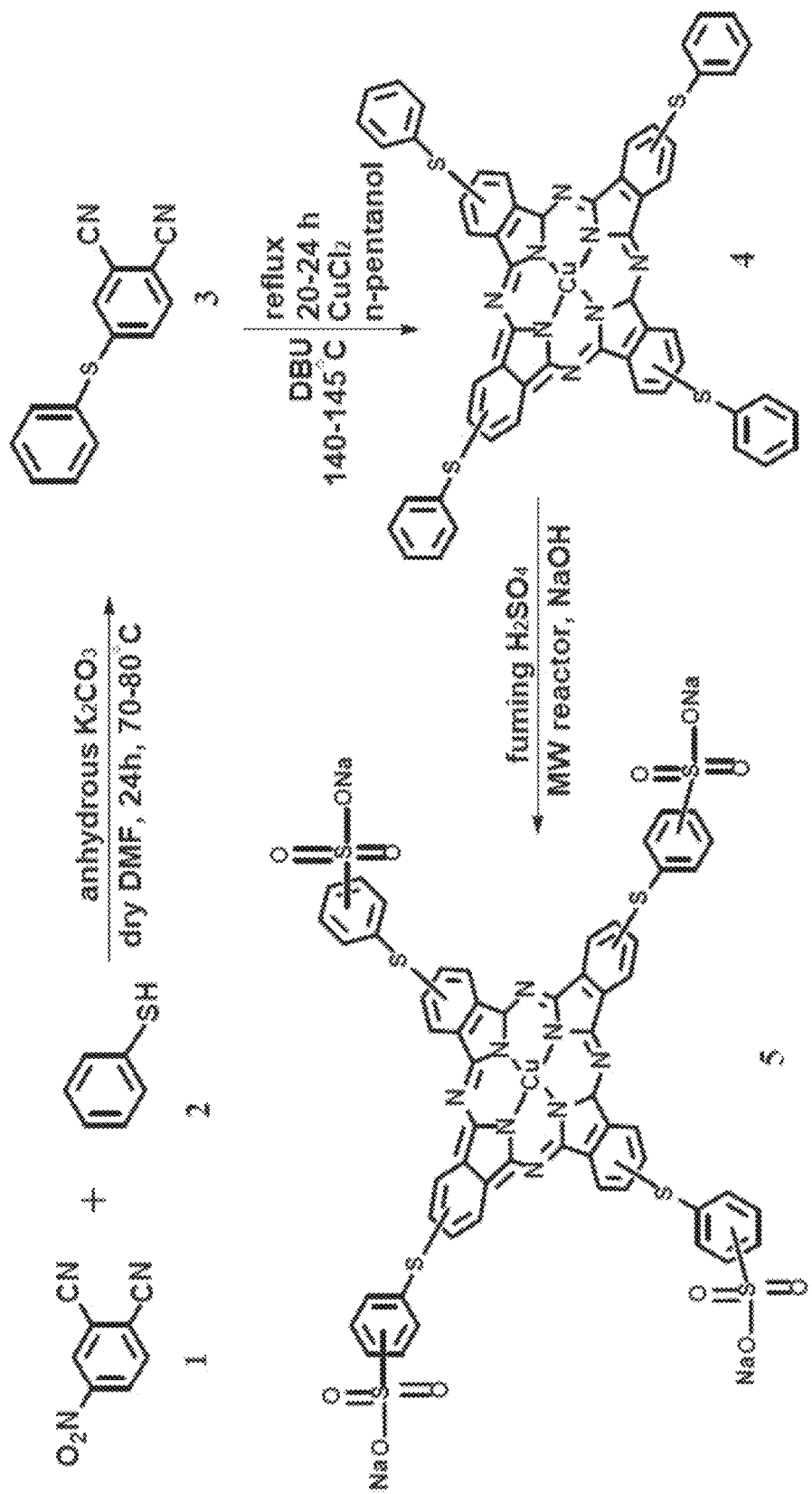
FIG. 1 shows a synthetic scheme for the sulfonated phenyl sulfide of copper(II)phthalocyanine, $(PhS \cdot SO_3Na)_4CuPc$ (where CuPc is the sulfonated phenyl sulfide of copper(II) phthalocyanine)

Aspects of the invention provide composite materials, comprising: a copper phthalocyanine compound, which may be substituted as detailed herein, as well as with methyl, ethyl, fluoro, chloro, hydroxyl, sulfonate, carboxylate, and/ or nitro groups in place of 1, 2, 3, 4, 5, 6, 7, or 8 hydrogens, particularly upon aryl groups; and ZnO. The composite material may comprise first spheroid particles having an average diameter in a range of from 50 to 450 nm, e.g., at least 50, 62.5, 75, 87.5, 100, 112.5, 125, 137.5, 150, 162.5, 175, 187.5, 200, 212.5, 225 237.5, or 250 nm and/or 450, 437.5, 425, 417.5, 400, 387.5, 375, 362.5, 350, 337.5, 325, 312.5, 300, 287.5, 275, 262.5, or 250 nm, and second spheroid having an average outer diameter in a range of from 0.5 to 5 μm, e.g., at least 0.5, 0.75, 0.875, 1, 1.125, 1.25, 1.375, 1.5, 1.625, 1.75, 1.875, 2, 2.125, or 2.5 μm and/or up to 5, 4.75, 4.5, 4.25, 4, 3.75, 3.5, 3.375, 3.25, 3.125, 3, 2.875, 2.75, 2.625, 2.5, 2.375, 2.25, 2.125, 2, 1.875, or 1.75 μm. The second spheroids may comprise at least 50, 60, 70, 75, 80, 85, 90, or 95% hemispheroid, and/or may have a morphology akin to a durian or rambutan (or hybrid thereof). The hemispheroids may have a morphology akin to a papakha hat, with orthogonally-oriented fuzz-like protrusions, view by SEM on 200 nm scale, from tangents to the spheroid surface.

The copper phthalocyanine compound may have a structure of a formula

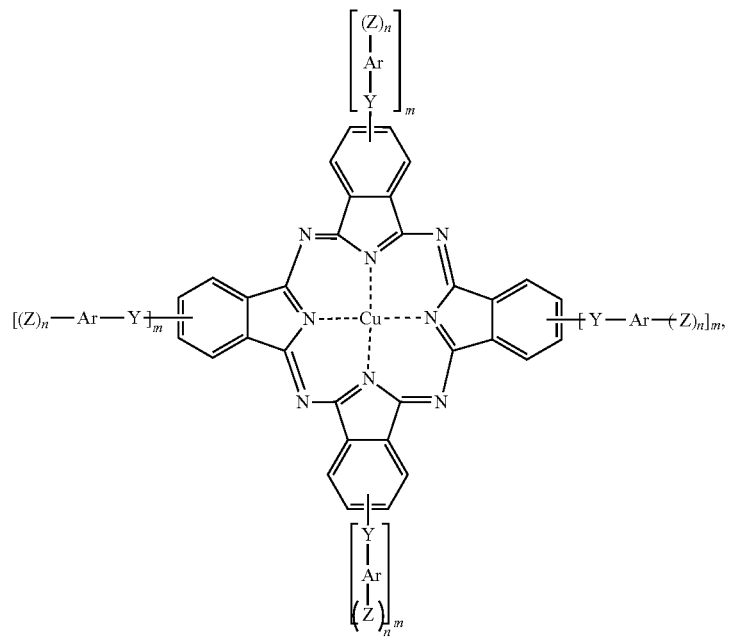

wherein Ar is an aryl group, such as phenyl, naphthyl, biphenyl, pyridyl, pyrrole, thiophene, pyrazole, imidazole, 1,2,4-triazole, 1,2,3-triazole, oxazole, isoxazole, isothiazole, thiazole, pyrimidine, pyridazine, pyrazine, 1,2,4-triazine, 1,3,5-triazine, indole, isoindole, indolizine, indazole, benzimidazole, 7-azaindole, 4-azaindole, 5-azaindole, 6-azaindole, 7-azaindazole, pyrazolo[1,5-a]pyrimidine, purine, benzofuran, isobenzofuran, benzo[c]thiophene, benzo[b] thiophene, benzo[d]isoxazole, benzo[c]isoxazole, benzo[d] isothiazole, benzo[c]isothiazole, benzo[d]oxazole, benzo[d] thiazole, benzo[c][1,2,5]thiadiazole, adenine, quinoline, isoquinoline, 4-quinolizine, quinoxaline, phthalazine, quinazoline, cinnoline, 1,8-napththyridine, pyrido[3,2-d]pyrimidine, pyrido[4,3-d]pyrimidine, pyrido[3,4-b]pyrazine, pyrido[2,3-b]pyrazine, pteridine, acridine, or phenazine, preferably phenyl, biphenyl and/or naphthyl, Y is independently O or S, Z is independently a sulfonate, phosphonate, or carboxylate, m is independently 0 or 1, and n is independently 0, 1, or 2. The copper phthalocyanine compound may be one in which Ar is phenyl, Y is S, Z is sulfonate, m is 1, and/or n is independently 0 or 1.

The copper phthalocyanine compound may be present in an amount of from 2.5 to 15 wt. %, relative to a total composite material weight, e.g., at least 2.5, 3, 3.5, 4, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, or 9.5 wt. % and/or up to 15, 14.5, 14, 13.5, 13, 12.5, 12, 11.75, 11.5, 11.25, 11, 10.75, 10.5, 10.25, 10, 9.75, 9.5, 9.25, 9, 8.75, 8.5, 8.25, or 8 wt. %.

Inventive materials may be synthesized hydrothermally, i.e., by heating a solution containing the starting materials in a closed vessel, generally above standard pressure, e.g., above 1, 1.05, 1.1, 1.25, 1.5, 2, 2.5, 3, 4, 5, 7.5, 10, or 15 atm and/or up to 100, 75, 65, 60, 55, 50, 45, 40, 35, 30, 25, 20, 17.5, 15, 12.5, 10, 7.5, or 5 atm, preferably in a single step.

Inventive materials may have a molar ratio of Cu to Zn in a range of from 3:1 to 1:3, e.g., at least 3:1, 2.75:1, 2.5, 2.25, 2:1, 1.875:1, 1.85:1, 1.8:1, 1.75:1, 1.7:1, 1.65:1, 1.6:1, 1.55:1, 1.5:1, 1.45:1, 1.4:1, 1.35:1, 1.3:1, 1.25:1, 1.2:1, 1.15:1, 1.1:1, 1.05:1, 1:1 and/or up to 1:3, 1:2.75, 1:2.5, 1:2.25; 1:2, 1:1.9, 1:1.85, 1:1.8, 1:1.75, 1:1.7, 1:1.65, 1:1.6, 1:1.55, 1:1.5, 1:1.45, 1:1.4, 1:1.35, 1:1.3, 1:1.25, 1:1.2, 1:1.15, 1:1.1, 1:1.05 or 1:1, or this molar relationship may be present in a hydrothermal solution used for the synthesis of inventive nanocomposites.

The first spheroids may have a sphericity of at least 0.85, 0.875, 0.9, 0.905, 0.91, 0.915, 0.92, 0.925, 0.93, 0.935, 0.94, 0.945, 0.95, 0.955, 0.96, 0.965, 0.97, 0.975, 0.98, 0.985, 0.99, or 0.995. The first spheroids may be hollow and/or may comprise at least 75, 80, 85, 90, 91, 92, 92.5, 93, 94, 95, 96, 97, 97.5, 98, 99, 99.1, 99.5, or 99.9% spherical particles. The second spheroid particles may comprise hollow hemispheres and/or hollow spheres. The hollow hemispheres, when extrapolated to spheres, and/or the hollow spheres may have a sphericity of at least 0.9, 0.905, 0.91, 0.9125, 0.915, 0.9175, 0.92, 0.9225, 0.925, 0.9275, 0.93, 0.9325, 0.935, 0.9375, 0.94, 0.9425, 0.945, 0.9475, 0.95, 0.9525, 0.955, 0.9575, 0.96, 0.9625, 0.965, 0.9675, 0.97, 0.9725, 0.975, 0.9775, 0.98, 0.9825, 0.985, 0.9875, 0.99, 0.9925, 0.995, or 0.9975. The (hollow) hemispheres may constitute, e.g., at least 75, 85, 90, 92.5, 95, or 97.5%, of the second spheroid particles. The optionally hollow hemispheres and/or spheres may have nanorods, protruding outwardly, orthogonally to spherical surfaces, and the nanorods may have an average diameter in a range of from 1 to 250 nm, e.g., 1, 2.5, 5, 7.5, 10, 12.5, 15, 17.5, 20, 22.5, 25, 27.5, or 30 nm and/or up to 250, 225, 200, 187.5, 175, 162.5, 150, 137.5, 125, 112.5, 100, 87.5, 75, 62.5, 50, 37.5, or 25 nm.

Aspects of the invention provide methods of synthesizing composites including preferably hollow micro(hemi)spheres and/or preferably hollow nanospheres. Inventive synthetic methods may comprise: combining a zinc compound and a copper phthalocyanine compound in a solvent to form a reaction mixture; and heating the reaction mixture at a temperature in a range of 100 to 200° C., e.g., at least 100, 105, 110, 115, 120, 125, 130, 135, 140, 145, or 150° C. and/or up to 200, 195, 190, 185, 180, 175, 170, 165, 160, 155, 150° C., for a treatment time in a range of 10 to 30 hours, e.g., at least 10, 10.5, 11, 11.5, 12, 12.5, 13, 13.5, 14, 14.5, 15, 15.5, 16, 16.5, 17, 17.5, or 18 hours and/or up to 30, 29, 28, 27, 26, 25, 24, 23, 22, 21, 20, 19, 18, 17, 16, 15, 14, 13, or 12 hours, wherein a molar ratio of the zinc compound to the copper phthalocyanine compound is in a range 3:1 to 1:3 (or any ratio described above). Useful zinc compounds may be chelates and/or salts of zinc, particularly zinc (II), comprising, e.g., acetylacetonate (acac, or 2,4-pentandione), 3,5-heptanedione, 3-methyl-2,4-pentanedione, 2-oxobutyric acid, methyl 3-oxopentanoate, ethyl propionylacetate, ethyl pivaloylacetate, methyl pivaloylacetate, ethyl 3-oxohexanoate, methyl 3-oxohexanoate, methyl 3-oxo-3-phenylpropanoate, ethyl 3-oxo-3-phenylpropanoate, ethyl isobutyrylacetate, methyl isobutyrylacetate, 1,2-diaminoethane, ethylenediaminetetraacetate, ethylene glycol-bis(3-aminoethyl ether)-N,N,N',N'-tetraacetic acid, diethylenetriamine penta is a phosphonic acid, aminotris (methylenephosphonic acid), ethylenediamine tetra(methylene phosphonic acid), diethylenetriamine, ammonia, hydrate, hydroxide, nitrate, nitrite, chloride, bromide, iodide, phosphate, sulfate, carbonate, acetate, oxylate, formate, citrate, phenoxide, salicylate, and/or lactate, as well as, e.g., C1, C2, C3, C4, C5, C6, C7, C8, C9, C10, C11, C12, C13, C14, and/or C16 alkyl sulfonate(s), phosphonate(s), and/or carboxylates.

The copper phthalocyanine compound may comprise at least 75, 80, 85, 90, 91, 92, 92.5, 93, 94, 95, 96, 97, 97.5, 98, 99, 99.1, 99.5, or 99.9 wt. % of sulfonated tetra thiophenyl copper phthalocyanine, in any form described herein.

The solvent may comprise at least 75, 80, 85, 90, 91, 92, 92.5, 93, 94, 95, 96, 97, 97.5, 98, 99, 99.1, 99.5, or 99.9 wt. % relative to total solvent weight, of a mixture of an alcohol and a glycol, such as ethylene glycol, methanol, ethanol, isopropanol, propanol, n-butanol, diethylene glycol, triethylene glycol, and/or tetraethylene glycol, especially, ethanol and diethylene glycol.

The zinc compound may comprise at least 75, 80, 85, 90, 91, 92, 92.5, 93, 94, 95, 96, 97, 97.5, 98, 99, 99.1, 99.5, or 99.9 wt. %, relative to total zinc salt weight, of zinc acetonylacetonate.

The heating and/or the hydrothermal synthesis may be conducted at a pressure in a range of from greater than 1 to 50 atm (or any of the above values or ranges).

The second spheroids, e.g., hollow micro(hemi)spheres, may have a diameter in a range of from 0.5 to 5.0 m (or any of the above values or ranges), and/or wherein the first spheroid particles, e.g., hollow nanospheres, may have a diameter in a range of from 50 to 450 nm (or any of the above values or ranges).

Aspects of the invention provide methods of decomposing one or more organic compounds in water, which methods may comprise: contacting any permutation of the inventive composite material(s) as described herein with an aqueous medium comprising the organic compound to form a mixture; and irradiating the mixture with ultraviolet and/or visible light. The mixture may further comprise 0.05 to 0.4 wt. % hydrogen peroxide, relative to the starting material weight (excluding solvent), e.g., at least 0.1, 0.125, 0.15, 0.175, 0.2, 0.225, 0.25, 0.275, 0.3, or 0.33 wt. % and/or up to 0.4, 0.375, 0.35, 0.325, 0.3125, 0.3, 0.2875, 0.275, 0.2625, 0.25, 0.245, 0.2375, 0.235, 0.2275, 0.22, 0.21, 0.205, or 0.2 wt %. The organic compound may comprise an organic dye, such as, e.g., anionic, cationic, azo, diazo, etc., dyes. The contaminant may comprise dyes, soaps, oils, and adhesives, e.g., fluorescent and/or phosphorescent compounds, chromophores and/or colorless compounds. The organic contaminant may comprise a dye, including acid dyes, basic dyes, direct dyes, reactive dyes, mordant dyes, etc., such as one or moreazo dyes, acridine dyes, anthraquinone dyes, arylmethane dyes, diarylmethane dyes, triarylmethane dyes, phthalocyanine dyes, quinone-imine dyes, azin dyes, eurhodine dyes, safranine dyes, indamines, indophenol dyes, oxazine dyes, oxazone dyes, thiazine dyes, thiazole dyes, xanthene dyes, fluorene dyes, pyronine dyes, fluorone dyes, rhodamine dyes, or mixtures of these. The organic compound may comprise methylene blue and/or malachite green. The organic compound may comprise a pharmaceutical, such as beta-blockers, antipyretics, analgesics, antimalarials, antibiotics, antiseptics, anticoagulants, antidepressants, anticancer drugs, antiepileptics, antipsychotics, antivirals, sedatives, antidiabetic, hormone replacements, oral contraceptives, stimulants, tranquilizers, statins, or mixtures of two or more of any of these. Beyond beta blockers, relevant compound classes may include 5-alpha-reductase inhibitors, angiotensin II receptor antagonists, ACE inhibitors, alpha-adrenergic agonists, dopamine agonist, dopamine antagonist, incretin mimetics, nonsteroidal anti-inflammatory drugs—cyclooxygenase inhibitors, proton-pump inhibitors, renin inhibitors, selective glucocorticoid receptor modulators, selective serotonin reuptake inhibitors, or mixtures of two or more of any of these. Biopharmaceuticals, such as antibodies, proteins, nucleotide sequences/splices, etc., may also be degraded. The contaminant compound may comprise one or more pharmaceuticals and/or chemical, paper, dye, wood, adhesive, etc., manufacturing byproducts not exclusively consisting of inorganic compounds, and the organic material is substantially or completely soluble in the water. The sufficiency of the method may be shown in that it can degrade persistent organic compounds, i.e., those which do not naturally decompose within a period of 1, 2, 3, 4, 5, or 6 days or 1, 2, 3, 4, 5, or 6 weeks (or more) under normal ambient Aspects of the invention provide methods for treating water, which may comprise: irradiating a mixture comprising an aqueous fluid comprising a first amount of bacteria with any permutation of the inventive composite material(s) as described herein, with ultraviolet and/or visible light to obtain a treated aqueous fluid comprising a second amount of bacteria, wherein the first amount is greater than the second amount of bacteria. The bacterium may be Gram-positive, Gram-negative, multi-drug resistant or otherwise. Such bacteria may include *Bacillus, Pseudomonas, Staphylococcus*, and/or *Micrococcus*, such as *Virgibacillus, Lactobacillus reuteri, Lactobacillus acidophilus, E. coli, Bacillus anthracis, Bifidobacterium animalis, Bacillus subtilis*, etc.) (*Helicobacter pylori*, enteritis *Salmonella, Streptococcus Thermophilus, Streptococcus pyogenes, Salmonella typhi*, mycobacteria, *Clostridium tetani, Yersinia pestis, M. luteus, M. roseus*, and/or *M. varians*, e.g., *Acinetobacter* spp., *Alcaligenes* spp., *Bacillus* spp., *Bordetella* spp., *Campylobacter* spp., *Citrobacter* spp., *Clostridium* spp., *Corynebacterium* spp., *Escherichia* spp., *Enterobacter* spp., *Enterococcus* spp., *Flavobacterium* spp., *Klebsiella* spp., *Legionella* spp, *Listeria* spp., *Micrococcus* spp., *Mycobacterium* spp., *Nocardia* spp., *Proteus* spp., *Providencia* spp., *Pseudomonas* spp., *Salmonella* spp., *Serratia* spp., *Shigella* spp., *Staphylococcus* spp., *Streptococcus* spp., *Streptomyces* spp., *Thermomonospora* spp., *Yersinia* spp., etc. Other relevant bacterium classes may include acidobacteria, actinobacteria, aquificae, armatimonadetes, bacteroidetes, caldiserica, chlamydiae, chlorobi, chloroflexi, chrysiogenetes, coprothermobacterota, cyanobacteria, deferribacteres, deinococcus-thermus, dictyoglomi, elusimicrobia, fibrobacteres, firmicutes, fusobacteria, gemmatimonadetes, lentisphaerae, nitrospirae, planctomycetes, proteobacteria, spirochaetes, synergistetes, tenericutes, thermodesulfobacteria, thermotogae, and/or verrucomicrobia.

Inventive materials need not include any terminal dicarboxylic acid, particularly terminal dicarboxylic acid, such as citrate, tartrate, an amino acid (e.g., serine, cysteine, aspartate, glutamate, tyrosine, etc.) or enantiomers thereof, or may no more than 5, 4, 3, 2.5, 2, 1, 0.5, 0.1, 0.01, 0.001, 0.0001, or 0.00001 wt. %, relative to the total nanomaterial weight, or total carbonaceous nanomaterial weight, of any of these, either individually or cumulatively.

Inventive materials need not include any plating such as indium tin oxide, a fluorine-doped tin oxide, and/or quartz glass, or may no more than 5, 4, 3, 2.5, 2, 1, 0.5, 0.1, 0.01, 0.001, 0.0001, or 0.00001 wt. %, relative to the total nanomaterial weight, of any of these, either individually or cumulatively.

Inventive methods can avoid sol-gel techniques, and may be synthesized and/or precipitate at pHs of, e.g., 7±0.1, 0.15, 0.2, 0.25, 0.33, 0.4, 0.5, 0.6, 0.75, 1, 1.5, 2, or 2.5.

The atomic relationship of Zn to Cu may be in a ratio of, e.g., at least 2:1, 1.75:1, 1.65:1, 1:5:1, 1:45:1, 1.4:1, 1.35:1, 1.3:1, 1.25:1, 1.2:1, 1.175:1, or 1.15:1 and/or up to 0.75:1, 0.8:1, 0.85:1, 0.9:1, 0.95:1, 0.975:1, 1:1, 1.025:1, 1.05:1, 1.075:1, 1.1:1, 1.125:1, 1.15:1, or 1.175:1. The CuPc (and/or analog) may be added to the pre-hydrothermal synthetic solution/mixture in a weight relationship to ZnO of, e.g., at least 0.75, 0.8, 0.85, 0.9, 0.95, 1, 1.05, 1.1, 1.15, 1.2, 1.25, 1.3, 1.35, 1.4, 1.45, 1.5, 1.55, 1.6, 1.65, 1.7, or 1.75 (w/w) % and/or up to 20, 17.5, 15, 12.5, 10, 9, 8, 7, 6, 5, 4, 3, 2.5, 2.25, or 2 (w/w) %. The CuPc may be present in the inventive materials, relative to total material weight, in an amount of, for example, at least 5, 5.5, 6, 6.5, 7, 7.5, 7.75, 8, 8.25, 8.5, 8.75, 9, or 9.25 wt. % and/or up to 15, 14, 13, 12.5, 12, 11.5, 11.25, 11, 10.75, 10.5, 10.25, 10, 9.75, 9.5, 9.25, 9, 8.75, 8.5, 8.25, or 7 wt. %.

Inventive materials may exclude semiconductor materials beyond ZnO (and any inherent properties of CuPc and/or CuPc analogs), for example, indium-tin-oxide, silicon, germanium, tellurium, gallium arsenide, gallium phosphide, gallium arsenide, gallium antimonide, titanium dioxide (rutile and/or anatase), tin oxide, silicon carbide (3C, 4H, and/or 6H), gray selenium, boron nitride (cubic, hexagonal, and/or nanotube), boron phosphide, boron arsenide, aluminum nitride, aluminum phosphide, aluminum arsenide, aluminum antimonide, indium nitride, indium phosphide, indium arsenide, indium antimonide, cadmium selenide, cadmium sulfide, cadmium telluride, zinc selenide, zinc sulfide, zinc telluride, cuprous chloride, cuprous sulfide, lead selenide, lead sulfide, lead telluride, tin (II) sulfide, tin (IV) sulfide, lead tin telluride, bismuth telluride, barium titanate, strontium titanate, lithium niobate, copper zinc tin sulfide, copper tin sulfide, and/or copper zinc antimony sulfide, or may comprise no more than 15, 10, 7.5, 5, 4, 3, 2.5, 2, 1, 0.5, 0.1, 0.01, 0.001, 0.0001, or 0.00001 wt. %, relative to the total inorganic composite weight, of such materials, either individually or in combination.

Aspects of the invention provide Cu-phthalocyanine (CuPc) used as a ZnO photosensitizer. Aspects of the invention provide single step syntheses of Cu-phthalocyanine/ZnO hollow nanospheres composite. Aspects of the invention may influence and/or adjust the size and/or shape of ZnO particles using Cu-phthalocyanine. Aspects of the invention may enhance the photocatalytic activity of ZnO nanomaterials by CuPc sensitization and/or the use of CuPc-sensitized ZnO nanomaterials to decompose one or more organic pollutants and/or pathogenic bacteria, e.g., under visible light irradiation. Moreover, aspects of the invention provide methods of stabilizing and/or recycling of ZnO as CuPc/ZnO (hollow) nanomaterials under solar irradiation.

Aspects of the invention provide a synthesis of Cu-phthalocyanine-ZnO composites, which may take the form of nanospheres and/or hollow nanospheres. Aspects of the invention may provide one pot and/or single step hydrothermal syntheses of such composites. Aspects of the invention may combine CuPc and ZnO to bring about nanostructural modifications to the pure ZnO structure, e.g., as a composite of preferably hollow shell microspheres having average diameters of, e.g., at least 1.5, 1.6, 1.7, 1.75, 1.8, 1.85, 1.9, 1.95, 2, 2.05, 2.1, 2.15, 2.2, or 2.25 µm and/or up to 2.5, 2.4, 2.3, 2.25, 2.2, 2.15, 2.1, 2.05, 2, 1.95, 1.9, 1.85, 1.8, or 1.75 µm, and hollow nanospheres of ZnO with average diameters in the range of, e.g., at least 175, 180, 185, 190, 195, 200, 205, 210, 215, 220, or 225 nm and/or up to 325, 320, 315, 310, 305, 300, 295, 290, 285, 280, or 275 nm, which can be distinct from agglomerated ZnO particles formed from pure ZnO samples in the absence of CuPc. Aspects of the invention may employ CuPc as a templating agent, e.g., for the formation of the hollow nanospheres of ZnO particles. Aspects of the invention include photocatalytically mineralizing organic pollutants under solar light irradiation with inventive composites.

Aspects of the invention provide enhanced photocatalytic activity by using CuPc/ZnO nanocomposite as compared to pure ZnO nanomaterials, evidencing the role of CuPc sensitizing ZnO under solar light irradiation. Aspects of the invention provide inventive composites as antibacterial agents against bacteria, including Gram-positive and/or Gram-negative bacteria, e.g., E-coli bacteria.

EXAMPLES

Chemicals: 4-nitrophthalonitrile (99.98%), ethanol, diethylene glycol (≥99%), benzene thiol (≥98%, FG), dimethylformamide (DMF) (99.8%), and zinc acetyl acetonate hydrate (99.99%) were purchased from Sigma-Aldrich. 4-Thiophenylphthalonitrile (FIG. 1, compound 3) was prepared as described in *Molec. Catal.* 2017, 433, 68-76, and *Photodiag. Photodyn. Ther.* 2018, 23, 25-31, each of which is incorporated by reference herein in its in entirety.

Materials Synthesis

Synthesis of tetra(4-thiophenyl)phthalocyaninatocopper (II), $(PhS)_4CuPc$, (FIG. 1, compound 4): 4-Thiophenylphthalonitrile (FIG. 1, compound 3) in a molar amount of 4 of 1 g, 4 mmol and copper (II) chloride (1.22 g, 5.5 mmol) were dissolved in 10 mL of dimethylaminoethanol (DMAE). DBU (4 mL, 0.04 mmol) was added. The mixture was refluxed, cooled, and then precipitated with methanol (25 mL). The solid was filtered off and washed with water. The crude products purified by column chromatography to yield $(PhS)_4CuPc$, (FIG. 1, compound 4) as a blue solid (8.03 mg, 67.8%). $^1$H-NMR (DMSO-d6): σ=8.4-8.7 (m, 4H, Pc-H); 8.7-8.9 (m, 8H, Pc-H), 9.2-9.5 (20H, mph) ppm. MS (FD): m/z=1012.75 ($M^+$). Elemental analysis: $C_{56}H_{36}N_8S_4Cu$, Found C, 65.78, H, 3.61, N, 10.88. Anal. Calcd. C, 66.52, H, 3.67, N, 11.03.

Synthesis of tetra(4-thiophenyl)sulphonated phthalocyaninatocopper(II), $(PhS·SO_3Na)_4CuPc$, (FIG. 1, compound 5): Tetra(4-thiophenyl)phthalocyaninatocopper (II), $(PhS)_4CuPc$, (FIG. 1, compound 4, 1.2 g, 1.2 mmol) was dissolved in 10 mL of fuming sulfuric acid (30% $SO_3$), added into a quartz tube, then transferred into a microwave reactor. The reaction temperature was first raised to 80° C. within 5 minutes and maintained for 15 minutes, then raised to 115° C. for 10 minutes, followed by 130° C., maintained for 30 minutes. The mixture was then cooled to room temperature. The solid formed was washed with column chromatography. A dark blue solution of $(PhS·SO_3Na)_4CuPc$ (FIG. 1, compound 5) was evaporated to blue solid (1.3 g, approx. 58% yield). The product, $(PhS·SO_3Na)_4CuPc$, (FIG. 1, compound 5), is soluble in water, ethanol, diethylene glycol, DMF, and DMSO. The mechanism of the overall synthesis of $(PhS·SO_3Na)_4CuPc$ (compound 5) is shown in FIG. 1.

Synthesis of CuPc/ZnO hollow nanosphere composites: A CuPc/ZnO nanocomposite was synthesized hydrothermally, in a method which may be accomplished in one pot and/or one step. In a typical method, 0.1 g (1.7 mmol) of CuPc, $(PhS)_4CuPc$, or $(PhS·SO_3Na)_4CuPc$, (i.e, the sulfonated material) was dissolved in 100 mL of a 1:1 solution of ethanol/diethylene glycol. 5 g of zinc acetylacetonate (20 mmol based on anhydrous $Zn(acac)_2$) were added to the solution of Cu/PC in ethanol/diethylene glycol, and the combined solution was stirred for 30 minutes. A suspension resulted, and the suspension was then transferred to 250 mL PFTE-lined autoclave, where it was maintained at 150° C. for 18 hours at a working pressure of ≤3 MPa or 30 Bar. The product was separated by centrifugation, washed 2 times with ethanol and dried at 70° C. for 1 hour. The dried solid nanomaterial was weighed to be 1.1 g, indicating that the percentage of CuPc in the nanocomposite sample is approx. 9 wt. %. Pure ZnO nanoparticles was synthesized by the same method without adding CuPc.

Photocatalytic Activity

The photocatalytic performance of the CuPc/ZnO hollow nanosphere composites were evaluated for the photocatalytic transformation of Crystal Violet (CV) and as a model water pollutant. The photocatalytic experiments were carried out using sunlight simulating lamp (PT2192, 125 W, mercury vapor bulb producing UVA, UVB, visible light, and heat). The photocatalyst (1 g/L) was dispersed in 100 mL of water, followed by 20 ppm of Crystal Violet (CV) dye. The resulting suspension was kept in the dark for 30 minutes under stirring to achieve an equilibrium. After the equilibrium was reached, the suspension was irradiated. Liquid samples were taken before and during the irradiation, then filtered to separate off the solid catalyst. The photocatalytic experiment was performed for pure ZnO and pure Cu-phthalocyanine (CuPc) for comparison. The photocatalytic experiments were also studied across a pH range, i.e., pH 2.5 to 10. The effect of $H_2O_2$ was also studied by adding 0.5 mL of 30 wt. % $H_2O_2$ to 100 mL of water containing 0.1 g CuPc/ZnO and 20 ppm Crystal Violet (CV) dye.

The reusability and stability of the photocatalysts was also studied by carrying out the photocatalytic experiment three times using the same photocatalyst. After each run the nanocomposite particles were collected and washed with distilled water several times by centrifugation until all the Crystal Violet (CV) dye was desorbed from the surface of the catalyst. The photocatalyst was then dried in air over for 1 h at 70° C. for the use in the next run.

In Vitro Antibacterial Studies

Bacterial strains: The antibacterial activity of pure ZnO, pure CuPc, and exemplary CuPc-ZnO composites was evaluated using as test organisms a Gram negative bacterium, *Pseudomonas aeruginosa* (ATCC 27853), and a Gram positive bacterium, *Bacillus cereus* (ATCC 14579). For activation, each indicator strain was sub-cultured in nutrient culture broth overnight at 37° C. on a shaker at 200 rpm.

Referring now to the drawings, wherein like reference numerals designate identical or corresponding parts throughout the several views.

FIG. 1 shows the mechanism of the overall synthesis of tetra(4-thiophenyl)-phthalocyaninatocopper (II), $(PhS·SO_3Na)_4CuPc$ (compound 5), as well as the starting materials tetra(4-thiophenyl)phthalocyaninatocopper(II), $(PhS)_4CuPc$ (compound 4), 4-(phenylthio)phthalonitrile (compound 3), benzenethiol (compound 2), and 4-nitrophthalonitrile (compound 1).

Figure 2:
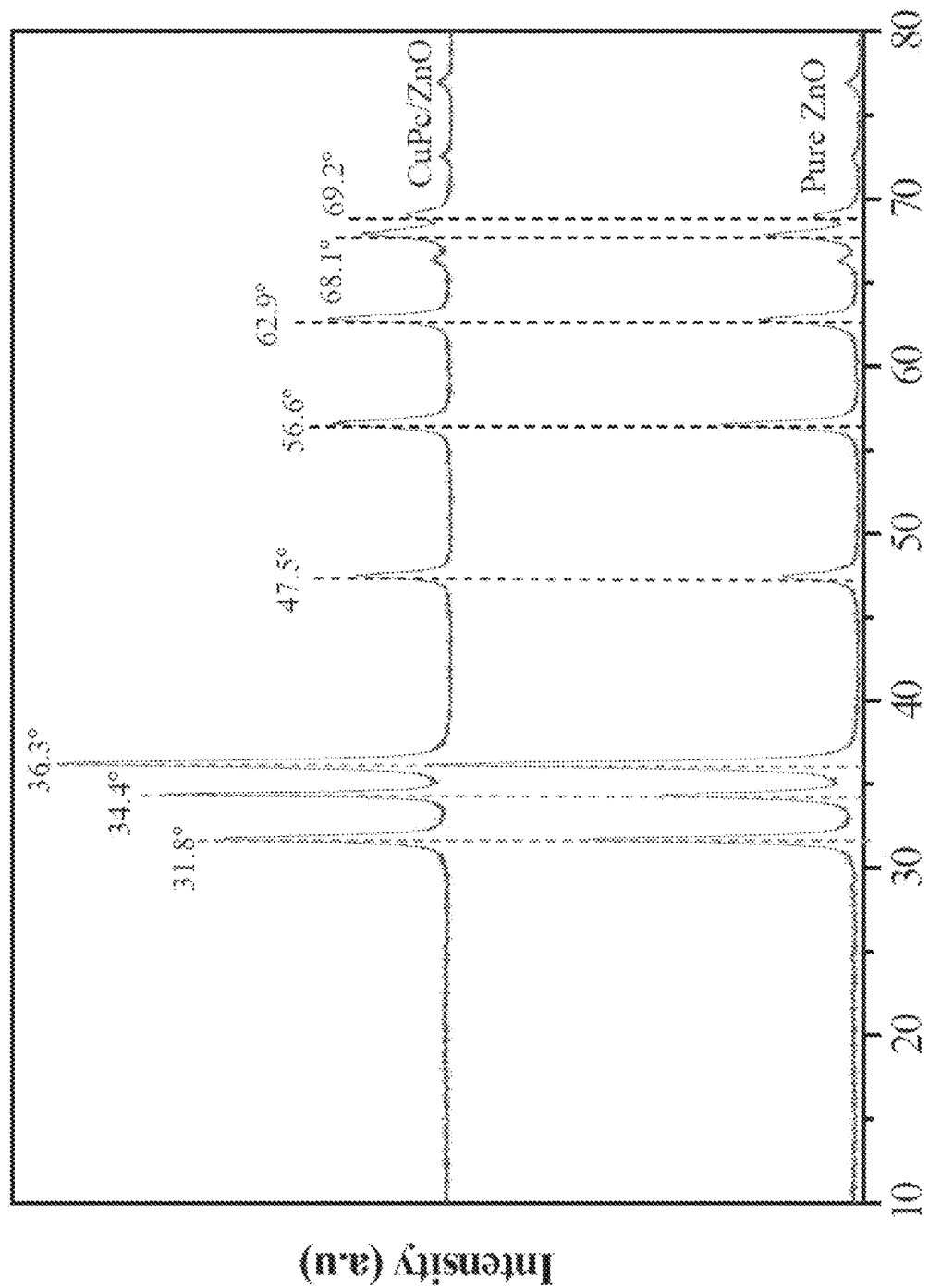
FIG. 2 shows x-ray diffraction (XRD) patterns of pure ZnO (lower pattern) and an exemplary CuPc-ZnO nanocomposite (upper pattern)

FIG. 2 show the x-ray diffraction (XRD) patterns of pure ZnO and an exemplary CuPc-ZnO composite. Pure ZnO and CuPc-ZnO samples show sharp and intense diffraction peaks at 31.8°, 34.4°, 36.3°, 47.5°, 56.6°, 62.9°, 66.6°, 68.1°, and 69.2° indicating the formation of a highly crystalline wurtzite-structure (JPCDS 36-1451) of ZnO. No change in the crystalline structure of ZnO particles was observed upon sensitization with CuPc.

Figure 3:
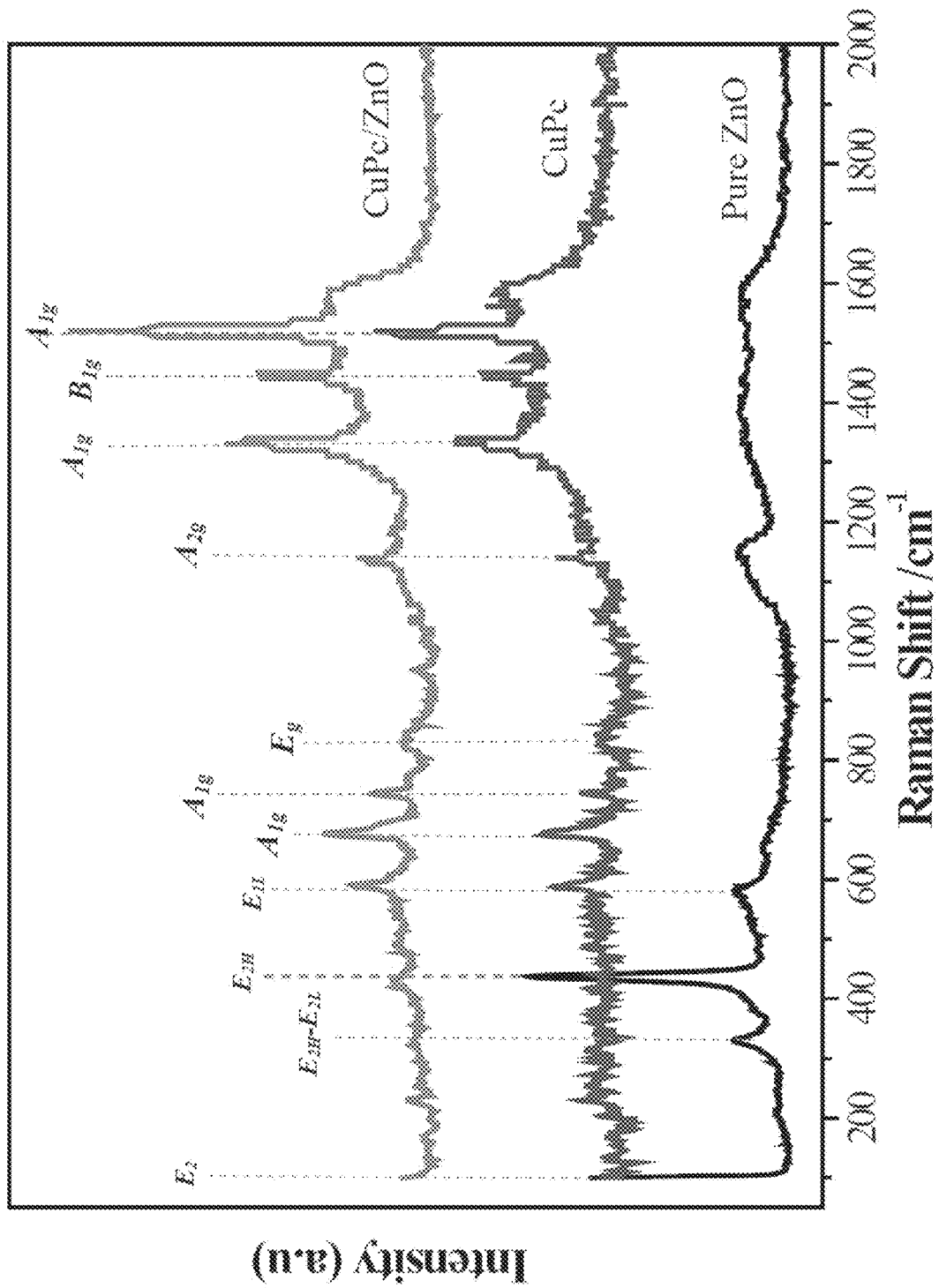
FIG. 3 shows Raman spectra of pure ZnO (lower spectrum), pure CuPc (middle spectrum), and an exemplary CuPc-ZnO nanocomposite (upper spectrum)

FIG. 3 shows Raman spectra of pure ZnO and an exemplary CuPc-ZnO composite. The Raman spectrum of ZnO exhibits a main peak at 437 $cm^{-1}$ characteristic of wurtzite hexagonal phase ZnO, an $E_{2H}$-$E_{2L}$ peak at 339 $cm^{-1}$, a lower $E_2$ peak at 99 $cm^{-1}$, and an $E_{2L}$ peak at 588 $cm^{-1}$. The (middled) Raman spectrum of CuPc shows strong bands at 585, 676, 1336, and 1521 cm$^{-1}$, attributable to $A_{1g}$, a band at 1448 cm$^{-1}$ attributable to $B_{1g}$, a band at 1136 cm$^{-1}$ attributable to $A_{2g}$ in plane vibration, and a slight band at 747 cm$^{-1}$ attributable to an $E_g$ out-of-plane vibration mode. The Raman spectrum of the exemplary CuPc-ZnO nanocomposite shows all peaks assigned to CuPc, i.e., the $A_{1g}$, $A_{2g}$, $B_{1g}$, and $E_g$ modes, in addition to the ZnO peaks at 99 cm$^{-1}$ ($E_2$), weak peak at 437 cm$^{-1}$ ($E_{2H}$), and the peak at 588 cm$^{-1}$ ($E_{1L}$), indicating a successful synthesis of the CuPc-ZnO nanocomposite.

Figure 4:
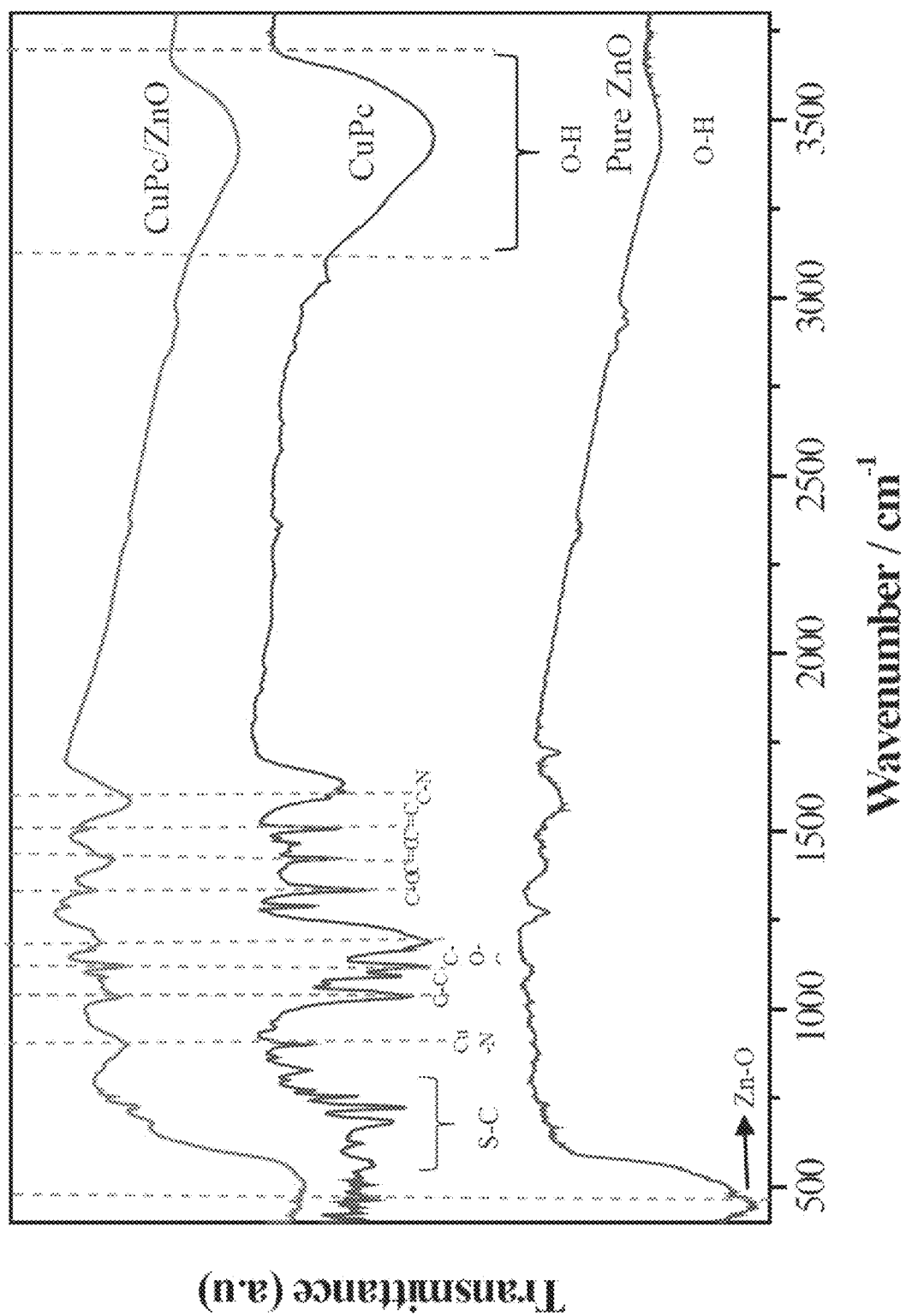
FIG. 4 shows Fourier-transform Infrared (FT-IR) spectra of pure ZnO (lower spectrum), pure CuPc (middle spectrum), and an exemplary CuPc-ZnO nanocomposite (upper spectrum)

FIG. 4 shows Fourier-transform Infrared (FT-IR) spectra of. The (middle) FT-IR spectrum of CuPc shows a typical broadband stretching located between 3700 to 3100 cm$^{-1}$, which may be attributed to the overlapped signal of O—H stretching vibration of sulfonic acid group, absorption bands at 1123 to 1287 cm$^{-1}$ attributable to symmetric and asymmetric stretching vibration of C—O—C, strong signal at 1421 and 1508 cm$^{-1}$ attributable to C═C bond stretching of aromatic groups, a speak at 1580 cm$^{-1}$ may be due to stretching vibration of the aromatic C—N group, signal at 1332 cm$^{-1}$ attributable to C—O bond stretching of carboxylic acid groups, signal near to 1033 to 1093 cm$^{-1}$ attributable to the aromatic C—C bending vibrations, a peak at 885 cm$^{-1}$ attributable to Cu—N stretching vibrations, and bands at 754, 725,680, 570 cm$^{-1}$ attributable to C—S bond vibration. The (lower) FT-IR spectrum of ZnO shows a band at 440 cm$^{-1}$, which is attributable to Zn—O stretching vibration. The FTIR spectrum of the CuPc-ZnO nanocomposite shows that the main peaks of CuPc and ZnO remain after the sensitization process, indicating the existence of CuPc and ZnO in the nanocomposite. Moreover, the intensity of broad band between 3700 and 3100 cm$^{-1}$ attributable to the O—H stretching vibration of sulfonic group in CuPc decreases, indicating the chemisorption of sulfonate groups onto ZnO surface.

Figure 5A:
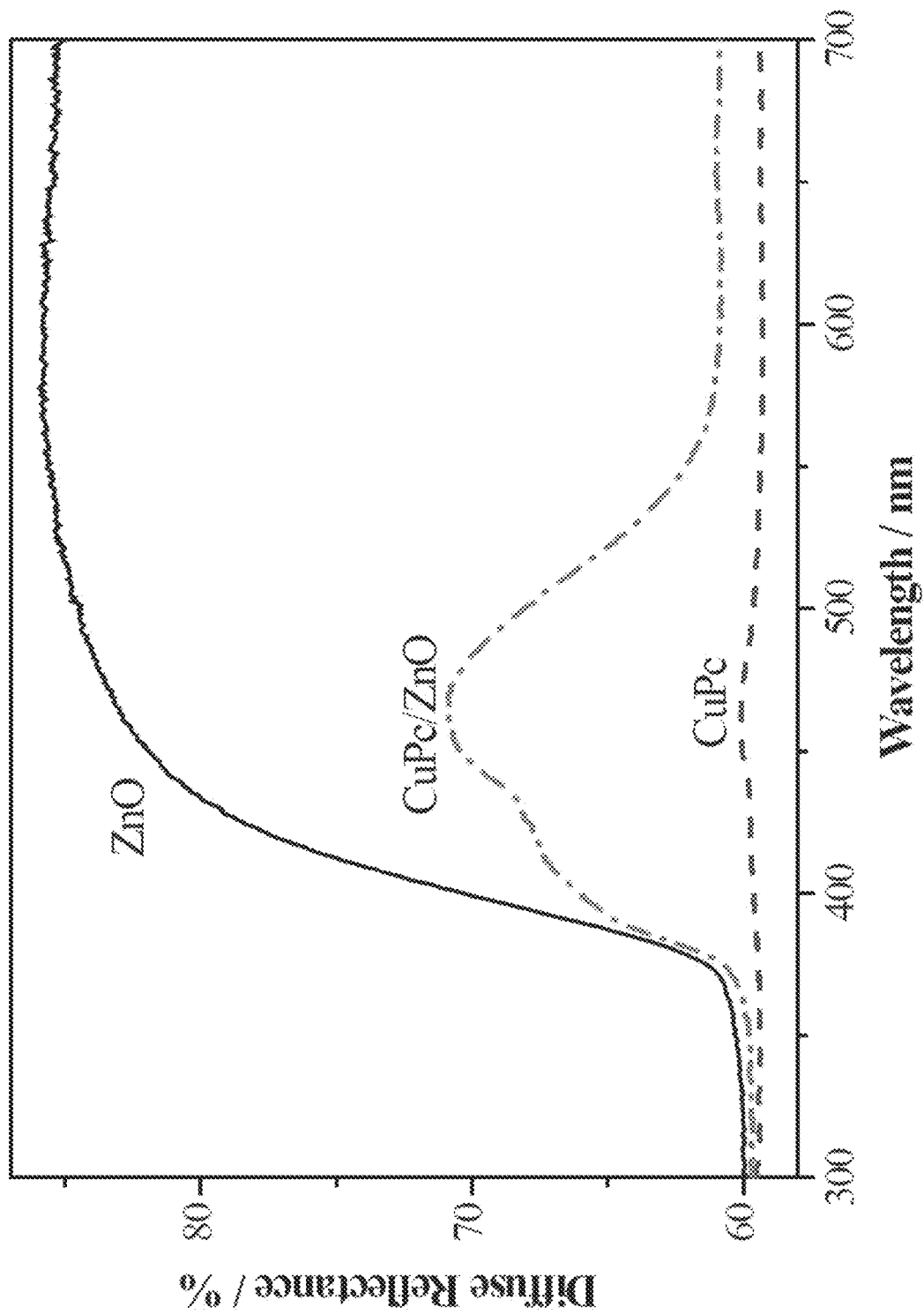
FIG. 5A shows diffuse reflectance UV-vis spectra of pure ZnO (upper spectrum), pure CuPc (lower spectrum), and an exemplary CuPc-ZnO nanocomposite (middle spectrum)

FIG. 5A shows the UV-vis diffuse reflectance spectra of pure CuPc, pure ZnO, and an exemplary CuPc-ZnO nanocomposite. The diffuse reflectance spectrum of ZnO (upper spectrum) shows an absorption shorter than 380 nm. The (middle) spectrum of the exemplary CuPc-ZnO nanocomposite shows broad absorption in the visible wavelength region with the band around 350 to 550 nm, a typical absorption for a CuPc dye.

Figure 5B:
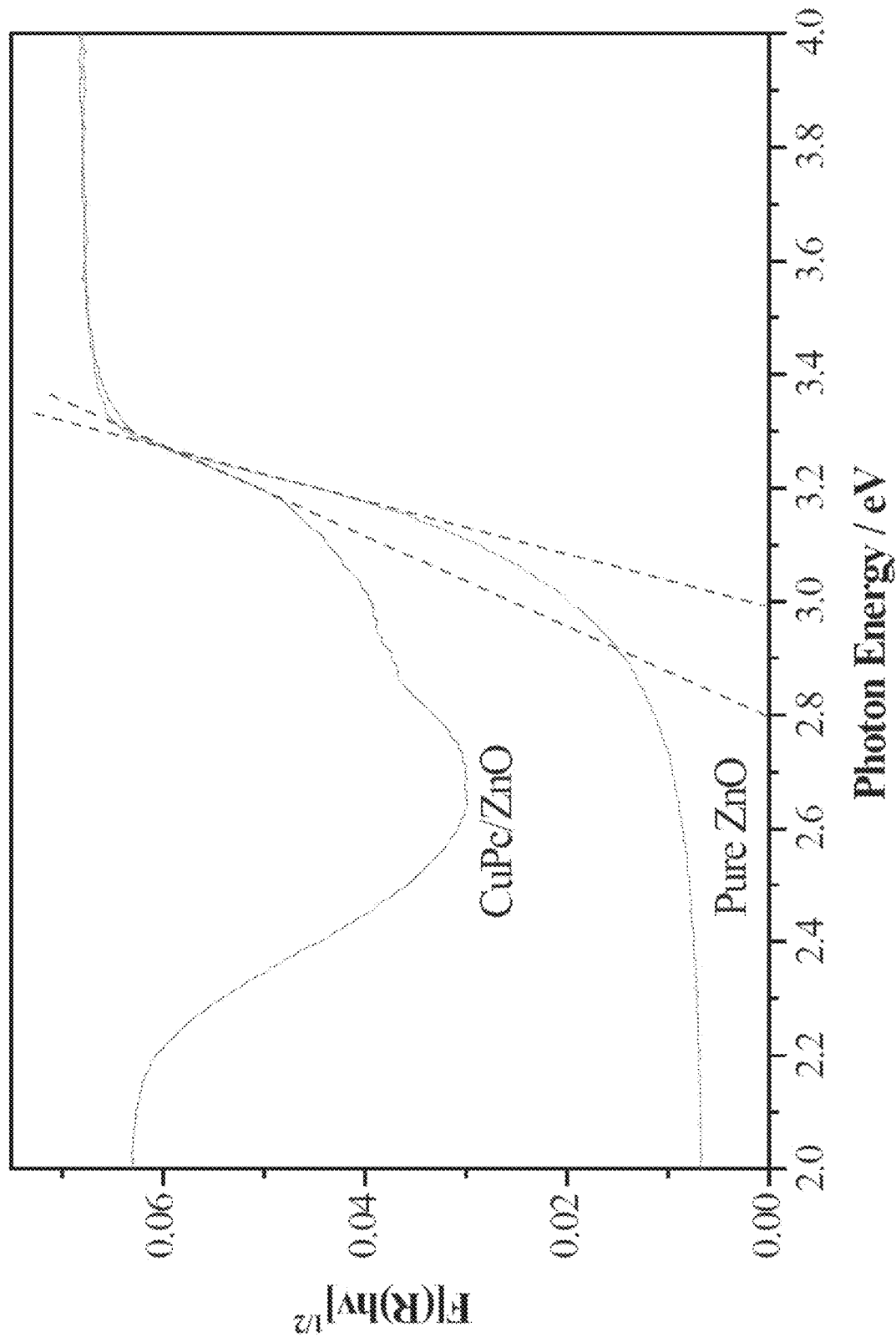
FIG. 5B shows Kubelka-Munk plots for the band gab energies of the pure ZnO (lower spectrum) and an exemplary CuPc-ZnO nanocomposite (upper spectrum) showing the intercept of the tangents of Kubelka-Munk plots.
Figure 6A:
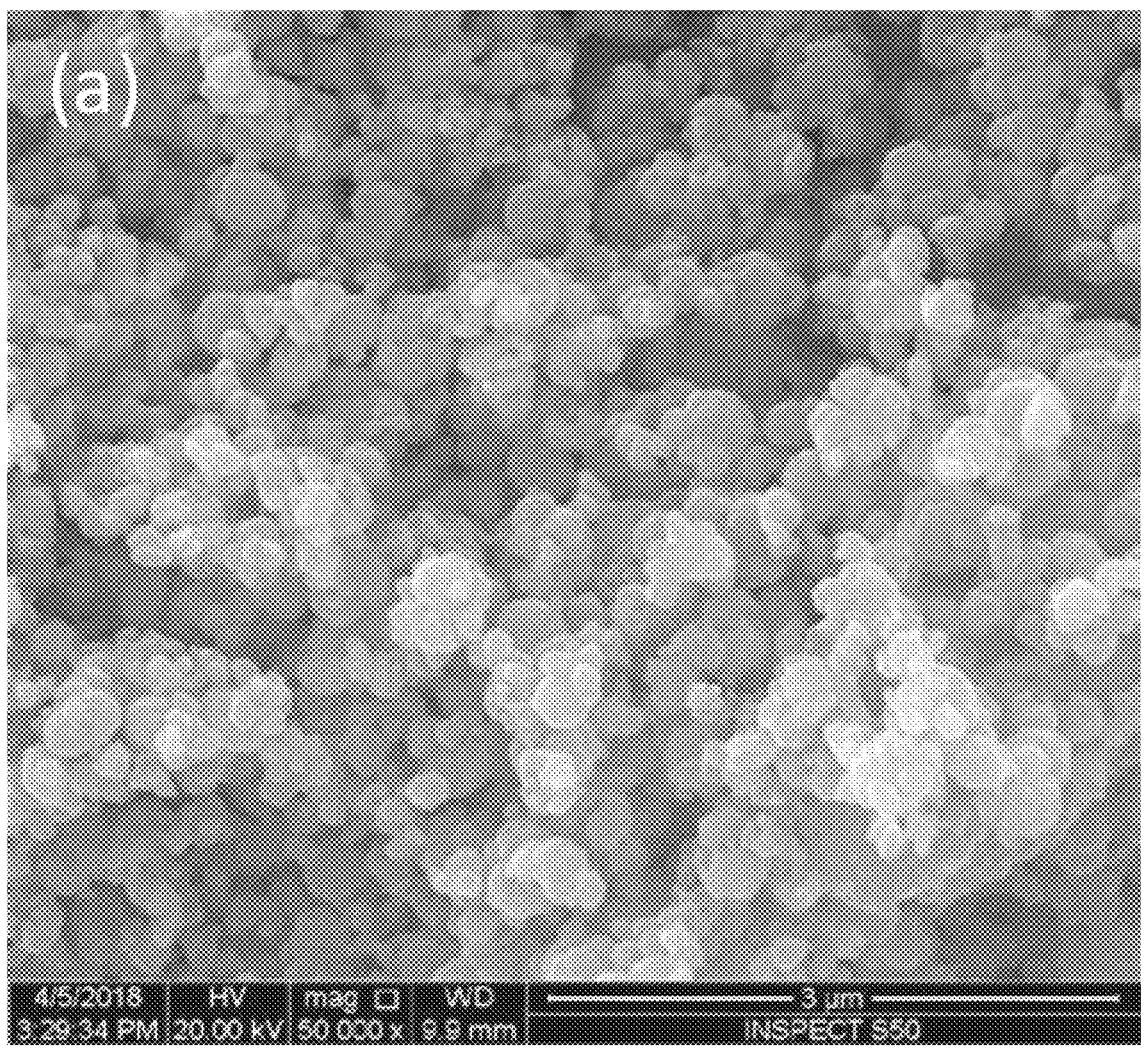
FIG. 6A shows a scanning electron microscope (SEM) image of pure ZnO.
Figure 6B:
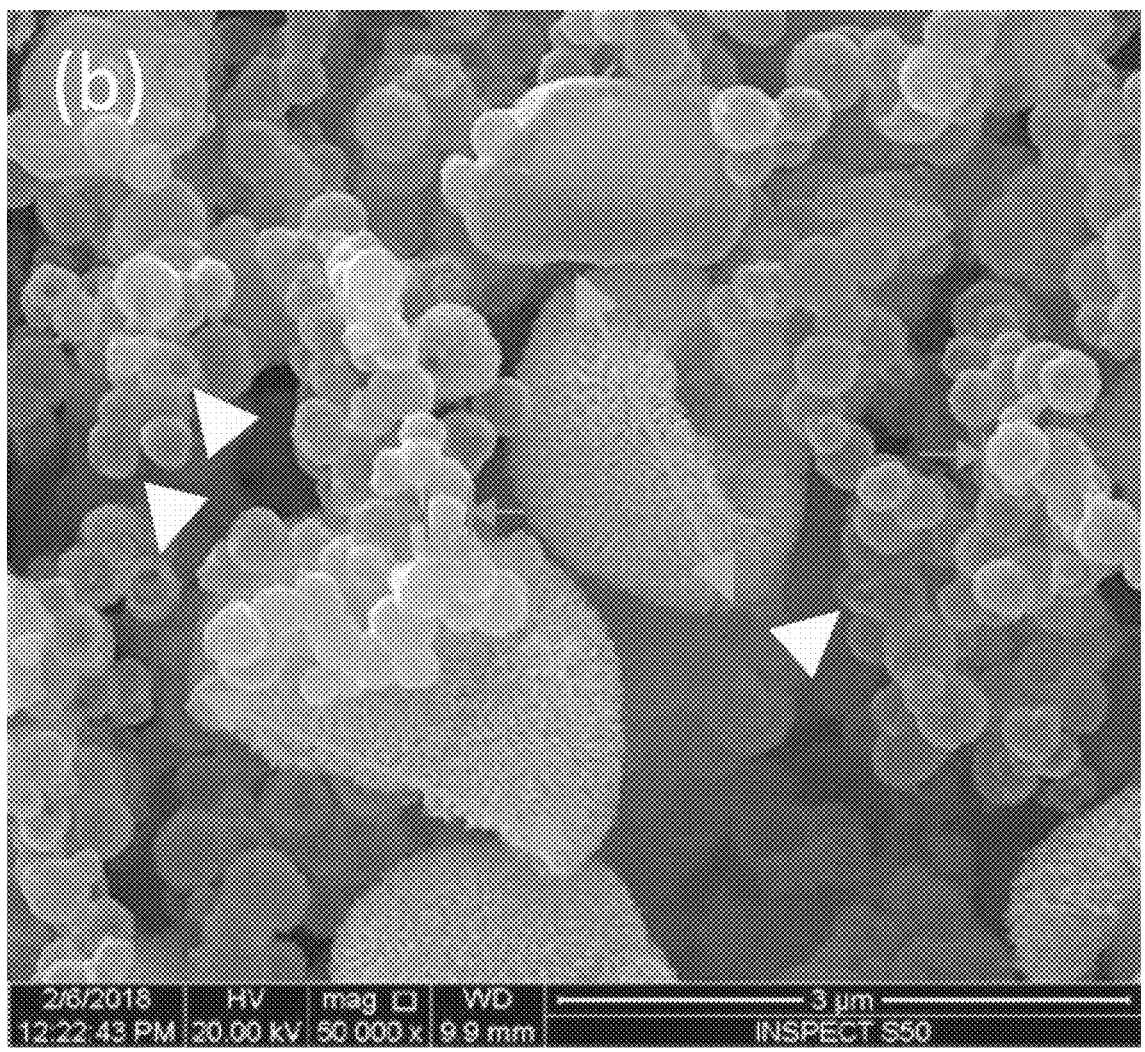
FIG. 6B shows an SEM image of an exemplary CuPc-ZnO nanocomposite with selected opening ends of the hollow spheres highlighted by arrowheads.

For band gap calculations, the reflectance spectra of all samples were analyzed using the Kubelka-Munk relation to convert the reflectance into a Kubelka-Munk function. The band gab energies of the pure ZnO and CuPc/ZnO have been estimated roughly from the intercept of the tangents of Kubelka-Munk plots as depicted in FIG. 5B. The band gap energy of pure ZnO nanoparticles determined, i.e., 3.0 eV, is in good agreement with the reported values. The band gab energy of the exemplary CuPc-ZnO composite was estimated to be 2.8 eV. Such a reduction in band gap energy, i.e., from 3.0 to 2.8 eV, indicates a successful sensitization of ZnO nanomaterials by copper phthalocyanine (CuPc).

FIG. 6A to 6C and FIG. 7A to 7F show the morphology and structure of synthesized samples investigated by scanning electron microscope (SEM) and transmission electron microscope (TEM). The SEM images of pure ZnO and an exemplary CuPc-ZnO composite are presented in FIGS. 6A and 6B. The SEM image in FIG. 6A of pure ZnO shows agglomerations of ZnO particles with sphere like structures. The SEM image in FIG. 6B of the CuPc-ZnO composite shows a composite of hollow shell microspheres with average diameters around 2 µm, e.g., ±0.05, 0.1, 0.15, 0.2, 0.25, 0.33, 0.4, 0.5, 0.67, 0.75, 1, 1.5, or 1.75 µm, and hollow nanospheres of small ZnO nanoparticles having diameters in the range of from 200 to 300 nm, e.g., average diameters of at least 150, 160, 170, 175, 180, 185, 190, 192.5, 195, 197.5, 200, 202.5, 205, 207.5, 210, 215, 220, 225 or 250 nm and/or up to 350, 340, 330, 325, 320, 315, 310, 307.5, 305, 302.5, 300, 297.5, 295, 292.5, 290, 285, 280, 275, or 250 nm.

The hollow nanospheres may have one end open, as depicted for a small number of such open-face spheres marked with yellow arrowheads in A. 6B. This observation was confirmed further by TEM examination. The SEM results reveal that CuPc may function as a templating agent for the formation of the hollow nanospheres of ZnO particles, as indicated from the CuPc-ZnO composite samples relative to pure ZnO (lacking CuPc).

Figure 7A:
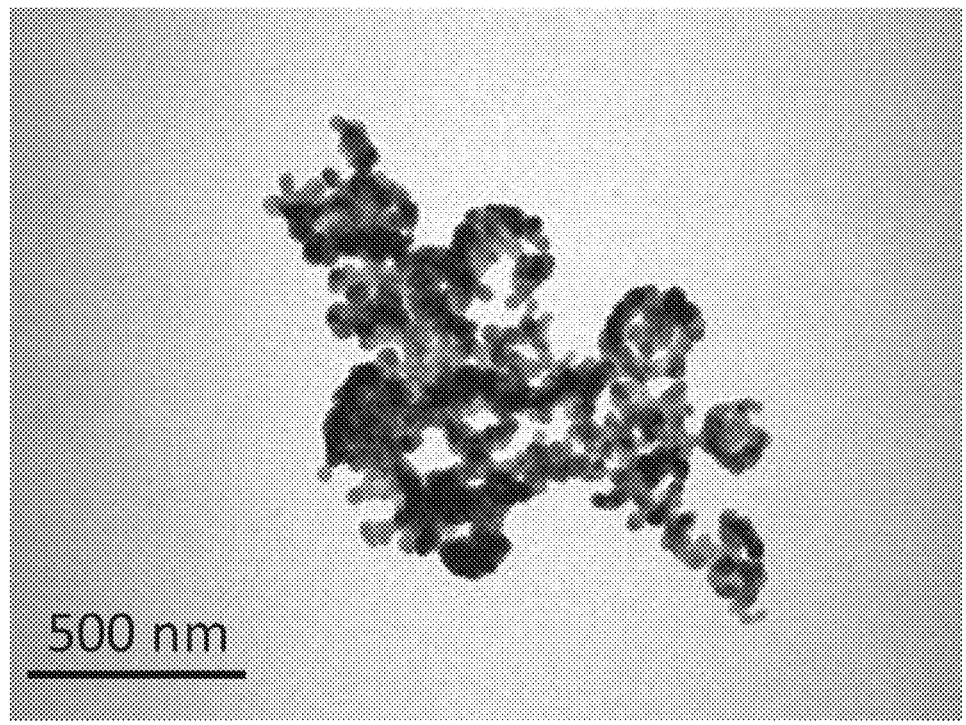
FIG. 7A shows a transmission electron microsope (TEM) images of pure ZnO on 500 nm scale.
Figure 7B:
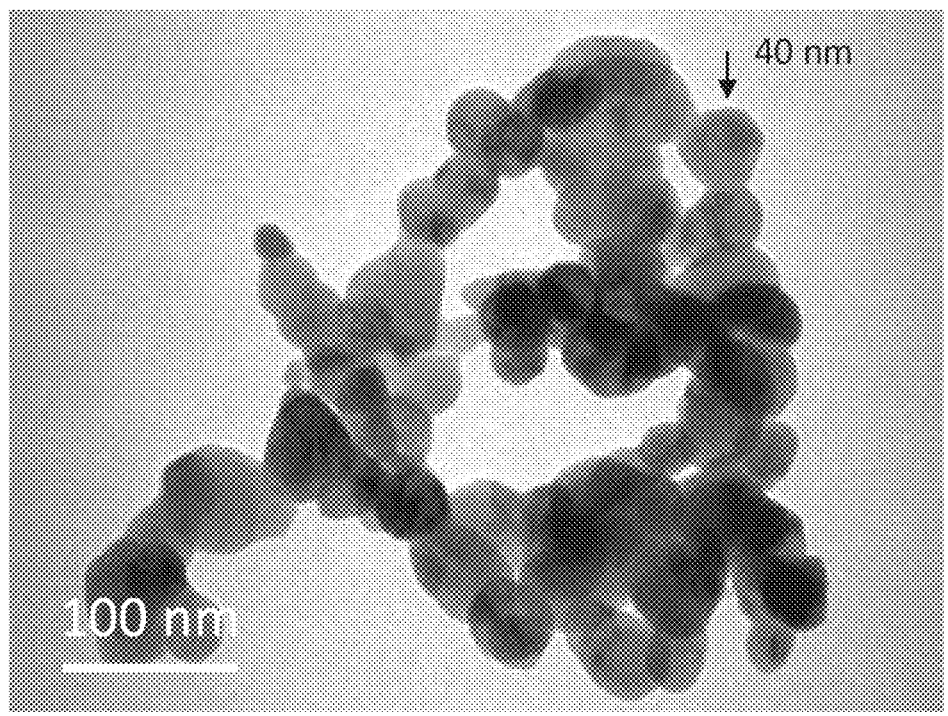
FIG. 7B shows a TEM image of pure ZnO on 100 nm scale.
Figure 7C:
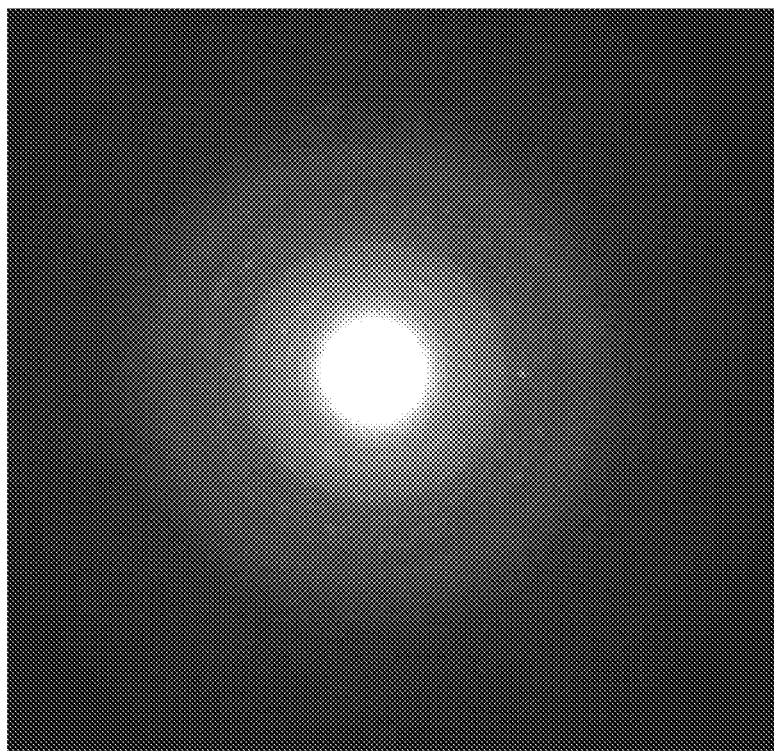
FIG. 7C shows a selected area electron diffraction (SAED) pattern of pure ZnO.

FIG. 7A to 7F show the results of TEM analysis of pure ZnO and an exemplary CuPc-ZnO composite, indicating a relatively clear morphology and structure of pure nanoparticles and nanocomposite, allowing the measurement of different features of the specimens. FIGS. 7A and 7B show TEM images of pure ZnO particles on 500 nm and 100 nm scale, exhibiting substantially spherical shapes with a sort of chain-shaped agglomeration, the average size of ZnO particles was estimated around 40 nm. FIG. 7C shows a selected area electron diffraction (SAED) pattern of the ZnO synthesized, indicating substantial crystallinity in the ZnO particles, with several rings in the electron diffraction pattern. The first five rings may be attributable to the (100), (002), (101), (102), and (110) planes of the ZnO.

Figure 7D:
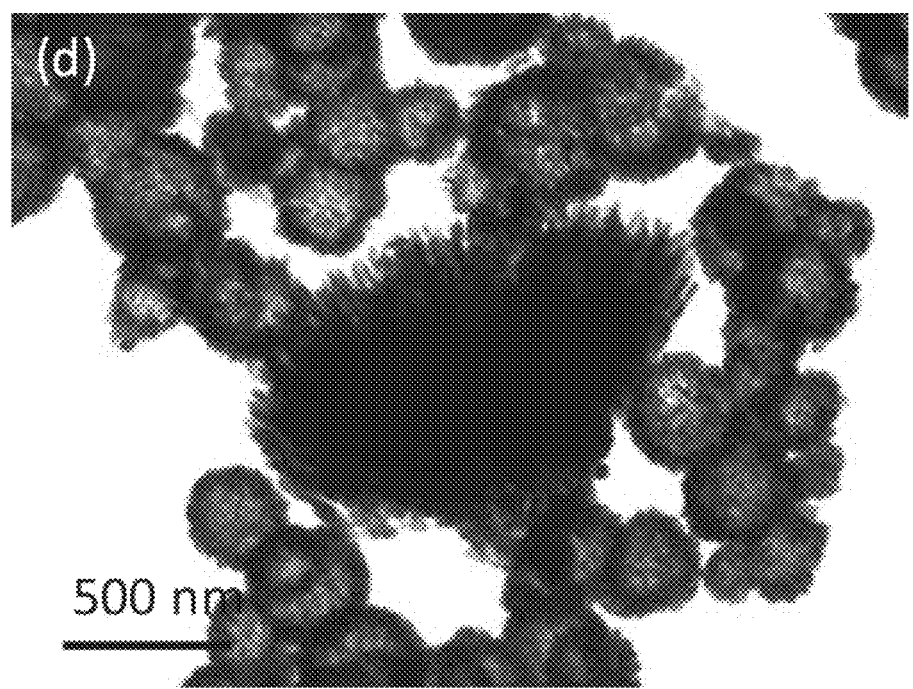
FIG. 7D shows a TEM image of an exemplary CuPc-ZnO nanocomposite on 500 nm scale.
Figure 7E:
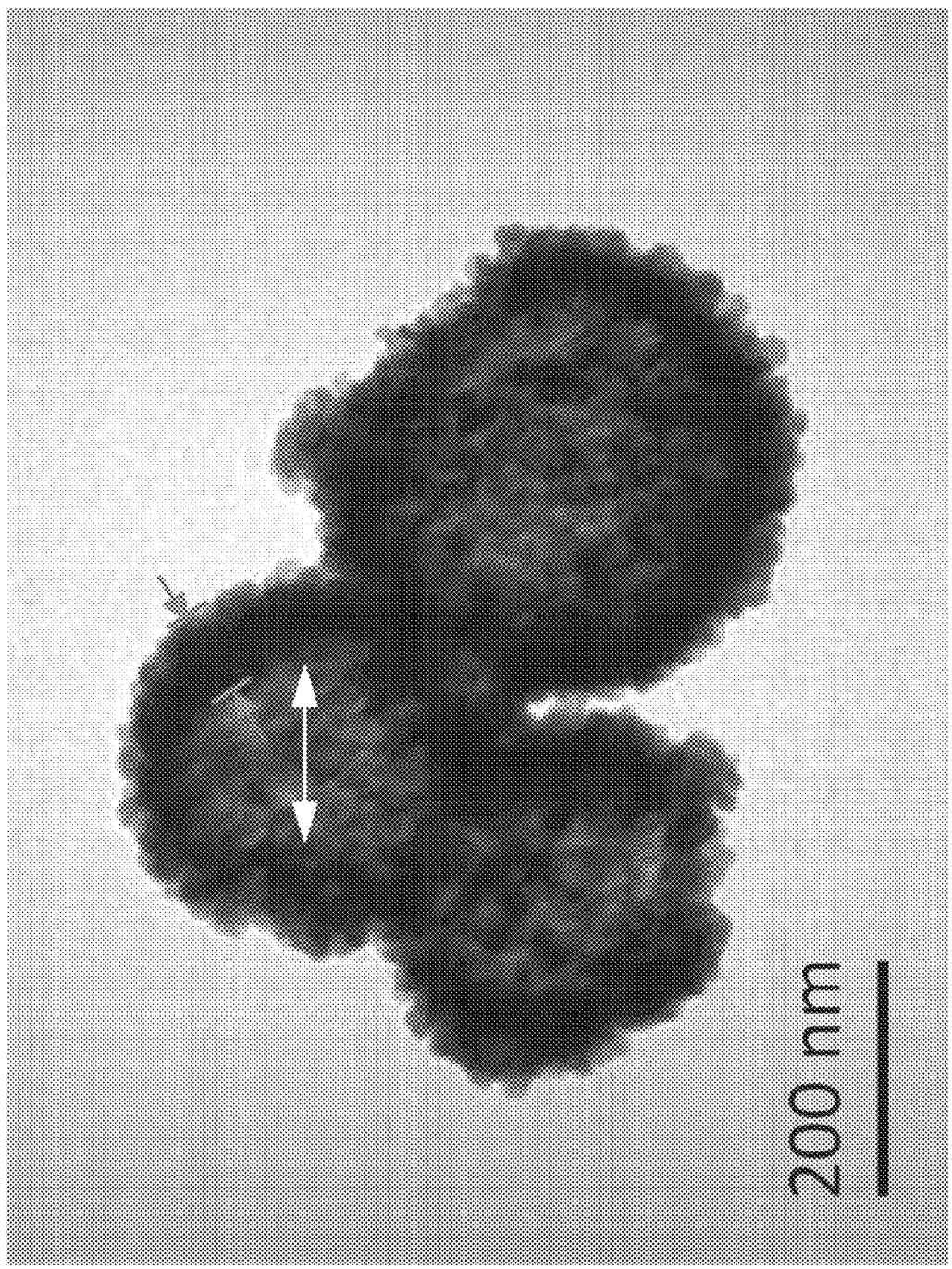
FIG. 7E shows a TEM image of an exemplary CuPc-ZnO nanocomposite on 200 nm scale.
Figure 7F:
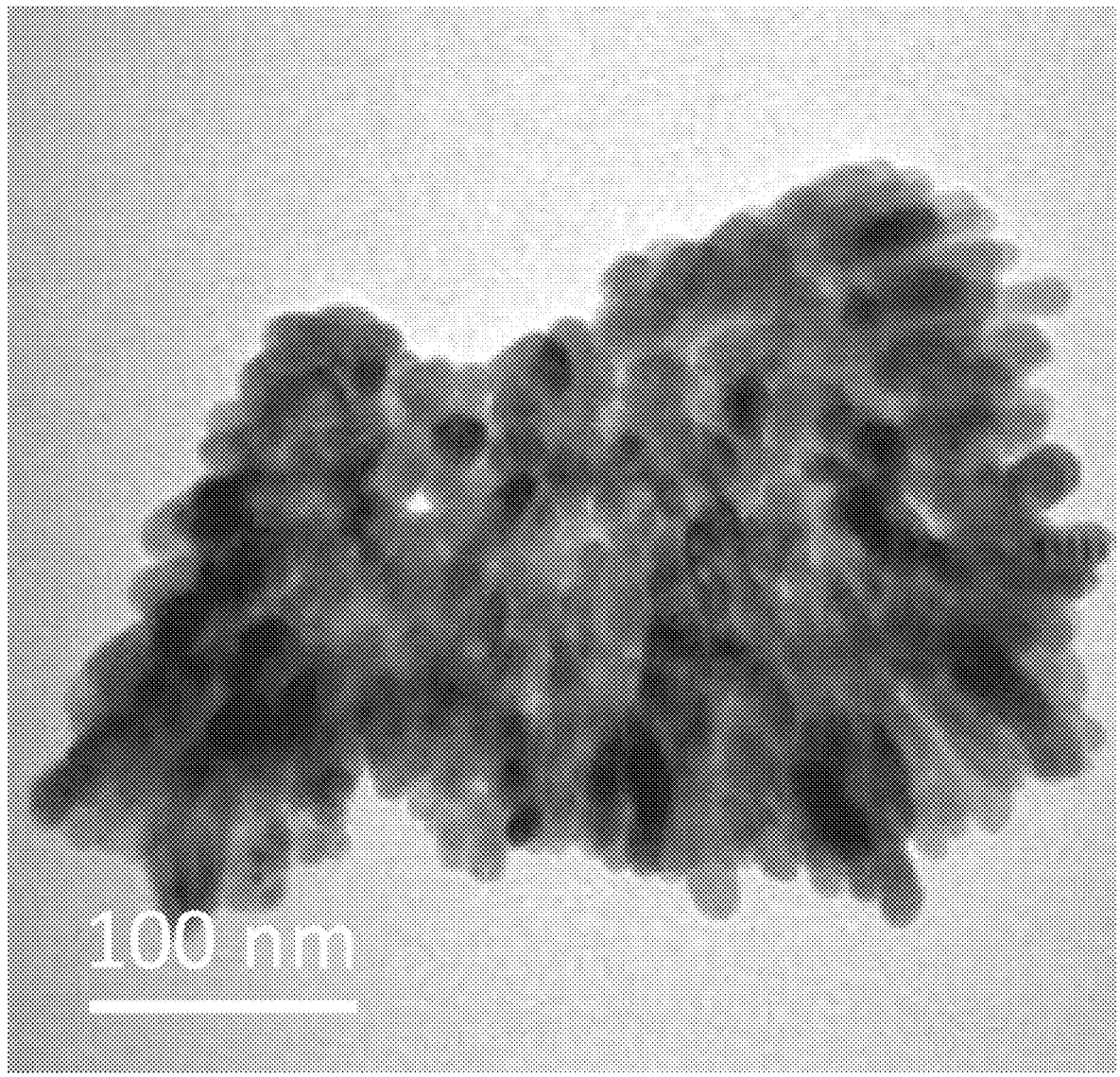
FIG. 7F shows a TEM image of an exemplary CuPc-ZnO nanocomposite on 100 nm scale.

FIG. 7D to 7F show the TEM of the structure of the CuPc-ZnO composite, wherein several nanospheres can be observed. As seen in FIGS. 7D and 7E, showing TEM images of the CuPc-ZnO composite at 500 nm and 200 nm, the average diameter of the spheres of the CuPc-ZnO composite can be estimated to be approximately 300 nm, e.g., ±5, 10, 15, 20, 25, 33, 40, 50, 67, or 75 nm. The hollow nature of the spheres is apparent in that the spheres exhibit bright cores of approx. 200 nm, e.g., ±5, 10, 15, 20, 25, 30, 35, 40, 45, 50, or 55 nm, and dark shells of around 100 nm, e.g., ±2.5, 5, 7.5, 10, 12.5, 15, 17.5, 20, 22.5, 25, 27.5, 30, 32.5, or 35 nm. As seen in the high magnification TEM image in FIG. 7F, the hollow spheres appear to comprise nanorods with average lengths of a few tens of nanometers, e.g., at least 10, 12.5, 15, 17.5, 20, 22.5, 25, 27.5, or 30 nm and/or up to 100, 90, 80, 75, 70, 65, 60, 55, or 50 nm, and an average thickness of approx. 10 nm, e.g., ±0.05, 0.1, 0.15, 0.2, 0.25, 0.3, 0.35, 0.4, 0.45, 0.5, 0.67, 0.75, 1, 1.25, 1.5, 1.75, 2, 2.25, 2.5, 3, 3.5, 4, or 5 nm.

Figure 8:
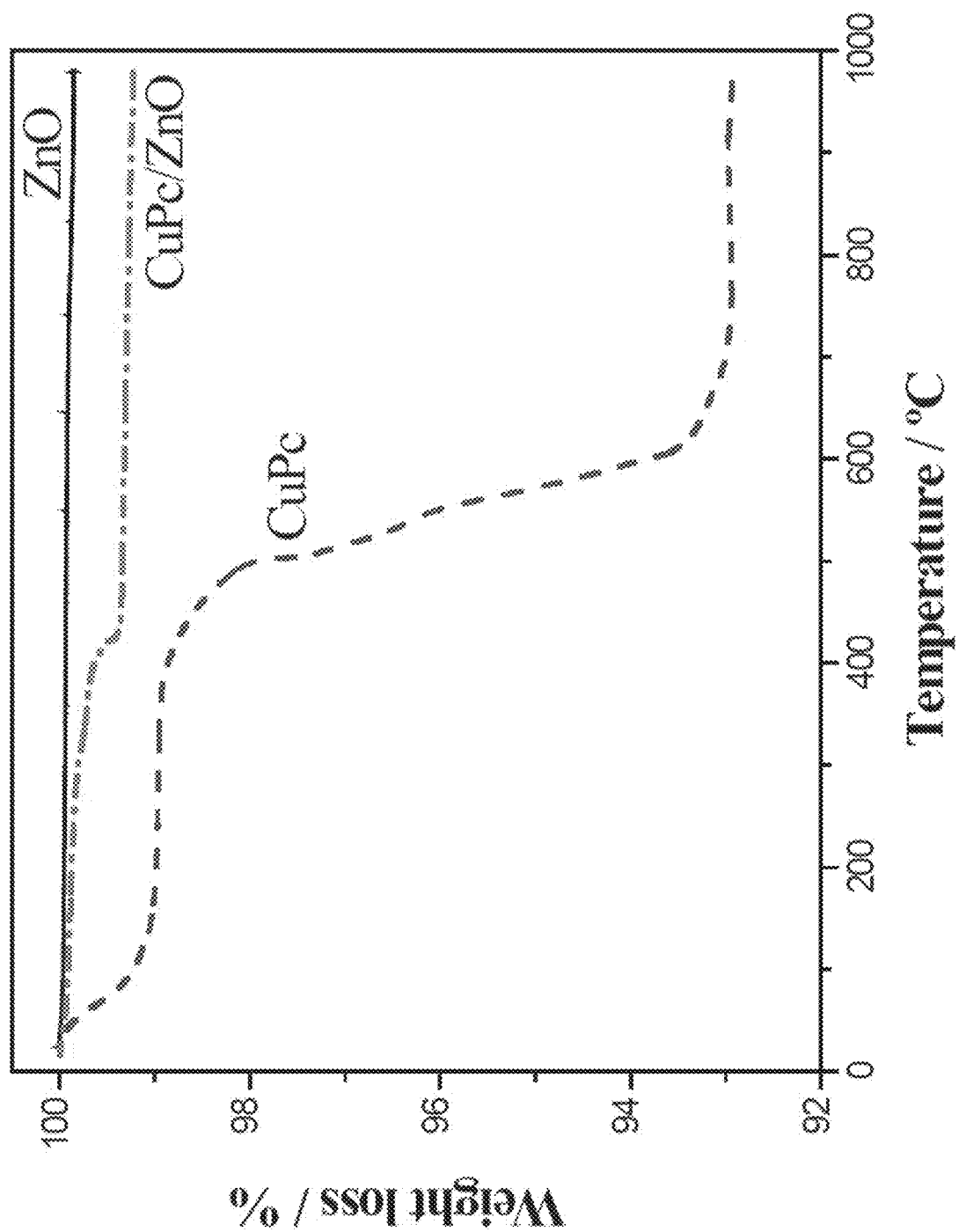
FIG. 8 shows thermogravimetric analysis (TGA) curves of pure ZnO (upper spectrum), pure CuPc (lower spectrum), and an exemplary CuPc-ZnO nanocomposite (middle spectrum)

FIG. 8 shows the thermal Gravimetric analysis (TGA) plots of the synthesized samples. The (upper) TGA plot of pure ZnO, as an inorganic material comprising little pyrolyzable matter, shows no notable weight loss until 1000° C., whereas CuPc is unstable at temperatures above approx. 490° C. The residual mass after heat treatment of CuPc-ZnO above approx. 490° C. may be attributed to the ZnO and CuO because the residual mass after heat treatment of CuPc-ZnO at above approx. 490° C. may be attributed to the ZnO and CuO. According to the TGA plots, the weight loss of about 8.7% is estimated for the CuPc-ZnO sample, indicating the percentage of loaded CuPc on ZnO nanoparticles. This value is found to be in agreement of the experimental value.

Photocatalytic Activity

Figure 9A:
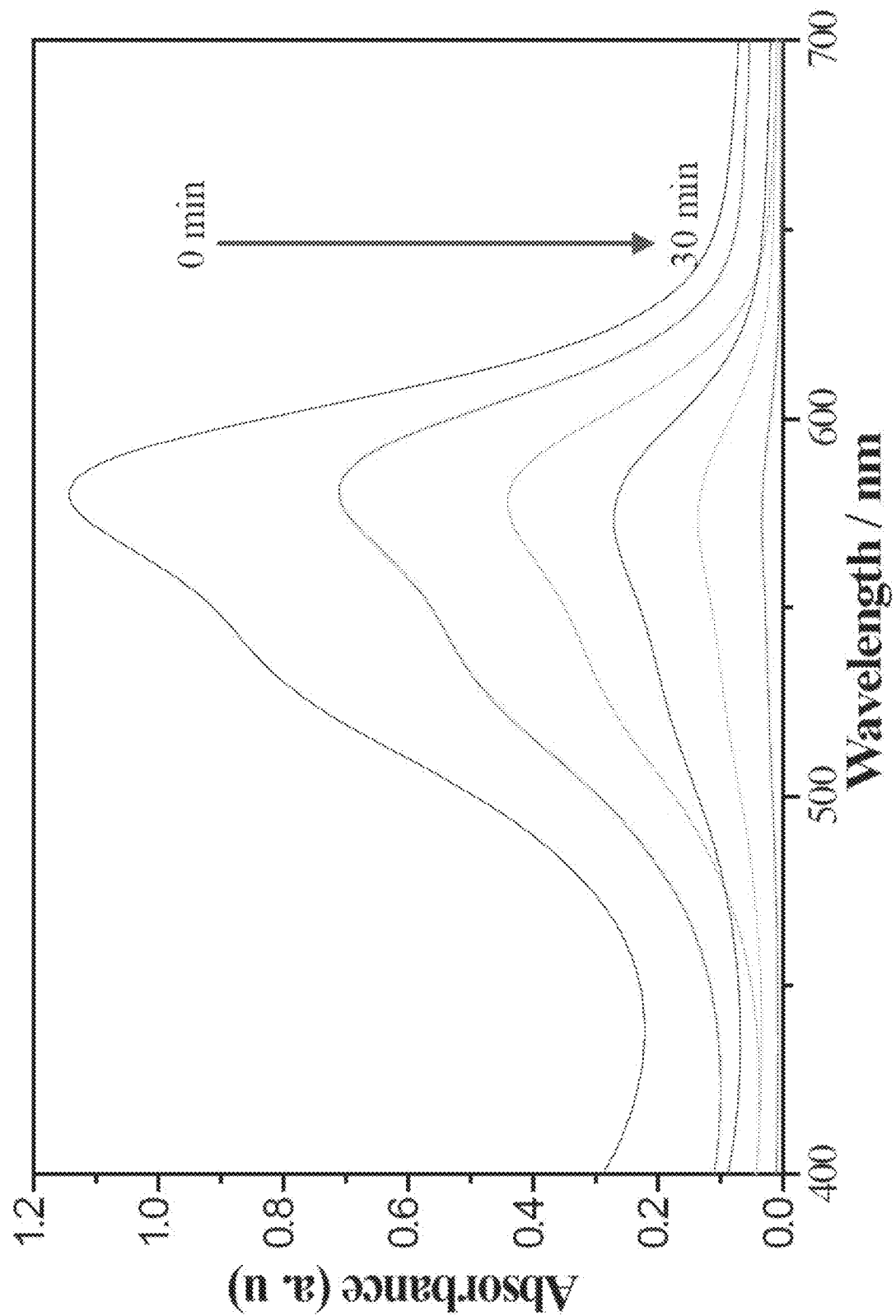
FIG. 9A shows UV-vis absorption spectra of an aqueous solution of Crystal Violet (CV) during visible light irradiation in the presence of an exemplary CuPc-ZnO nanocomposite with $H_2O_2$ at pH 5.

FIG. 9A to 9D show experimental results relevant to the photocatalytic performance of the synthesized nanomaterials for the oxidation of Crystal Violet (CV) dye under visible light irradiation. The exemplary CuPc-ZnO nanocomposite exhibits superior photocatalytic activity compared to pure ZnO. FIG. 9A shows the UV-vis absorption spectral change of Crystal Violet (CV) dye in the presence of the exemplary CuPc-ZnO composite over time, i.e., from 0 to 30 minutes.

Figure 9B:
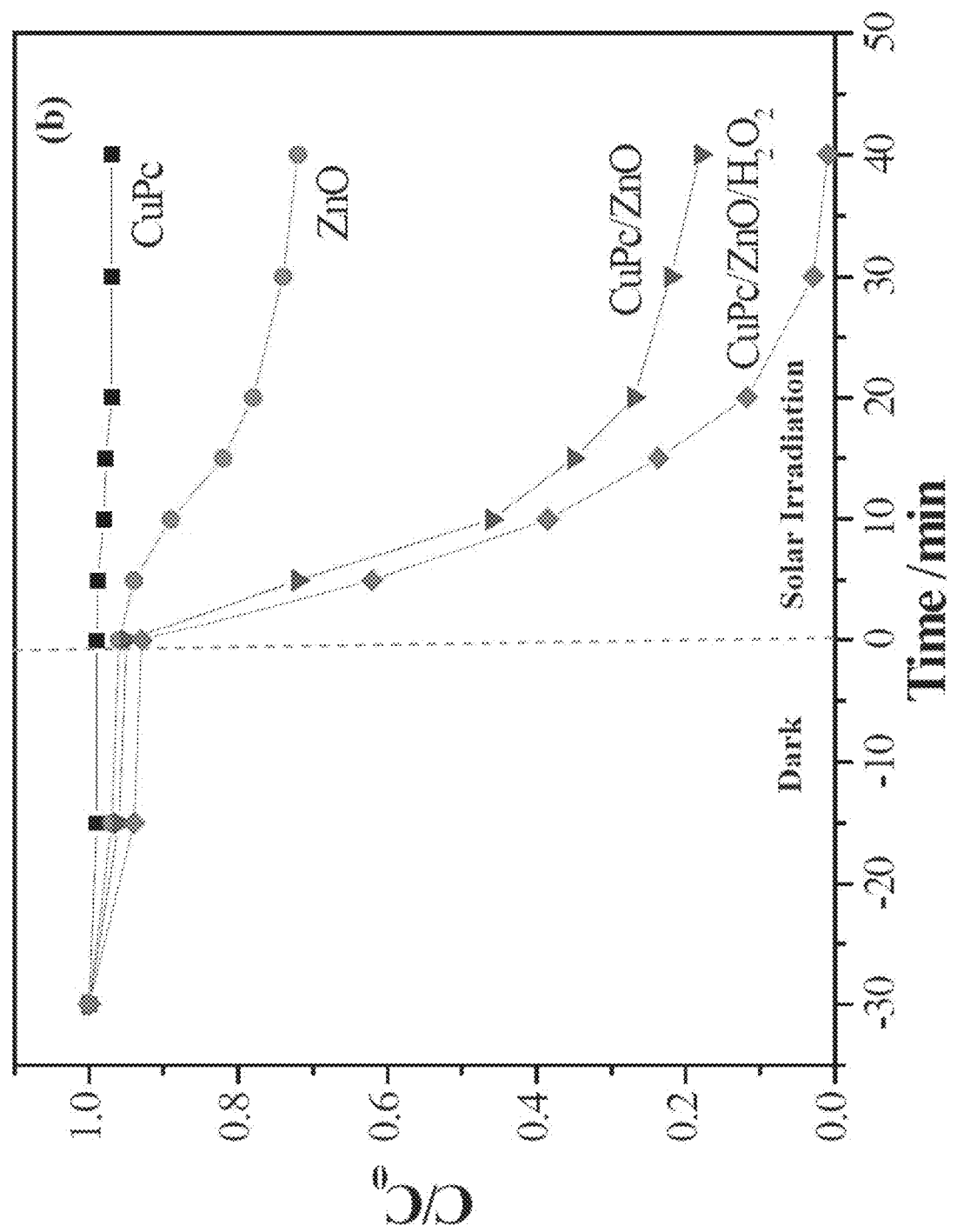
FIG. 9B shows concentration-based ($C/C_0$) photocatalytic degradation efficiency for Crystal Violet (CV) over irradiation time at pH 5 with different materials, CuPc (top plot), ZnO ($2^{nd}$ plot from top), an exemplary CuPc-ZnO nanocomposite ($2^{nd}$ plot from bottom), and an exemplary CuPc-ZnO nanocomposite with $H_2O_2$ (bottom plot)

FIG. 9B shows the efficiency of Crystal Violet (CV) degradation under different conditions. The Crystal Violet (CV) dye alone exhibits very slow degradation under visible light, while a faster degradation rate was observed when ZnO is used as a catalyst. In the presence of CuPc/ZnO, more efficient degradation has been achieved, resulting in the degradation of about 82 mol. % of Crystal Violet (CV) dye in only 40 minutes, while 100 mol. % of Crystal Violet (CV) dye has been degraded using CuPc/ZnO composite in the presence of $H_2O_2$. This enhancement in the photocatalytic (degradation) activity can be attributed to the synergism between CuPc and ZnO. 100 mol. % degradation efficiency of Bromophenol blue dye under visible light irradiation has been reported using a Ni-phthalocyanine-$TiO_2$ photocatalyst compared to 32 mol. % using only pure $TiO_2$, in *Molec. Catal.* 2017, 433, 68-76. Upon visible light irradiation metallophthalocyanine dyes, e.g., NiPc, CuPc, etc., generally absorb the visible light forming the excited dye molecules, which may then inject the electrons into the metal oxide, e.g., $TiO_2$, ZnO, etc., producing active oxygen radical species.

Figure 9C:
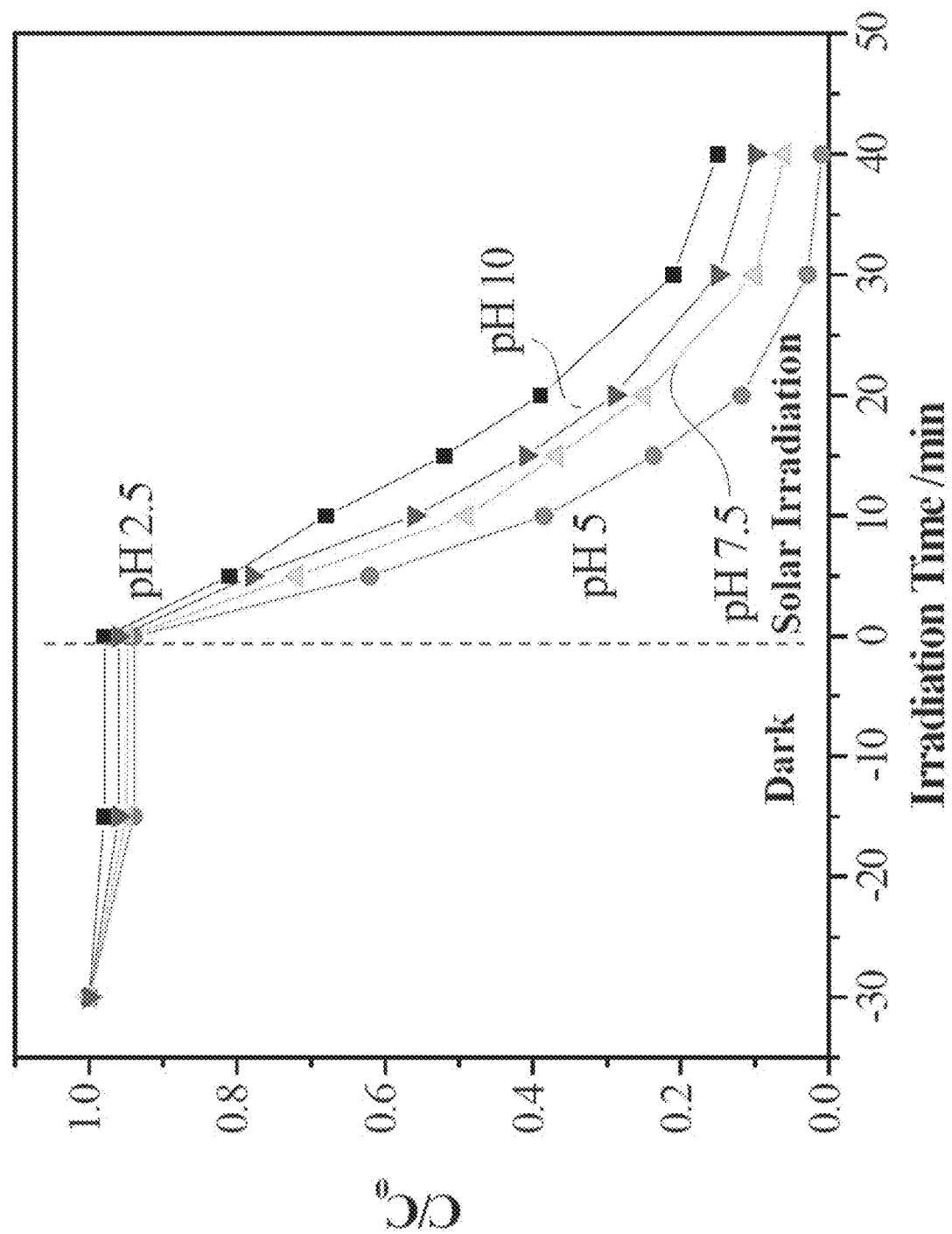
FIG. 9C shows pH-based photocatalytic degradation efficiency for Crystal Violet (CV) over irradiation time with an exemplary CuPc-ZnO nanocomposite with $H_2O_2$ (i.e., CuPc-ZnO—$H_2O_2$) at different pH values, pH of 2.5 (top plot), pH of 10 ($2^{nd}$ plot from top), pH of 7.5 ($2^{nd}$ plot from bottom), and pH of 5 (bottom plot)

FIG. 9C shows the results of photocatalytic degradation experiments of Crystal Violet (CV) under various pH values, i.e., 2.5 to 10. As can be seen in FIG. 9C, the best degradation result was obtained near the natural pH, i.e., pH 5. The photocatalytic degradation was observed to increase near the zero point of charge of ZnO nanoparticles.

Figure 9D:
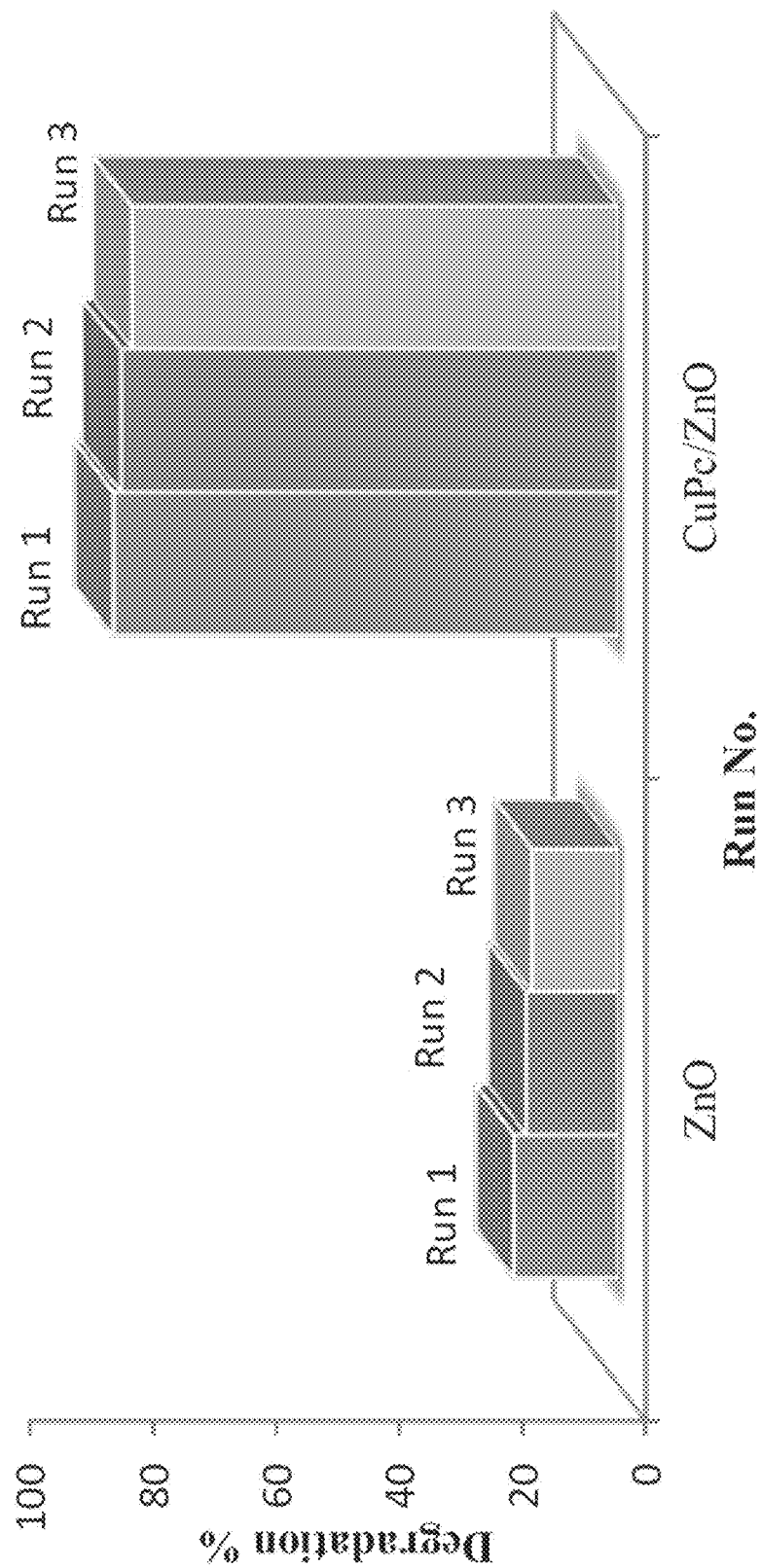
FIG. 9D shows charts indicating the recyclability of pure ZnO and an exemplary CuPc-ZnO nanocomposite for the photocatalytic degradation efficiency for Crystal Violet (CV) over irradiation time at pH 5.

FIG. 9D shows recyclability measurements of the ZnO and the exemplary CuPc-ZnO nanocomposite systems for the photocatalytic degradation of Crystal Violet (CV). As seen in FIG. 9D, the photocatalytic activity decreased 82.4% over three runs with ZnO and 96.34% over three runs with the exemplary CuPc-ZnO composite, and the decrease was 96.4% for CuPc-ZnO—$H_2O_2$ (which is not shown). That is, only slight change in the photocatalytic activity was been observed for the CuPc-ZnO systems after 3 runs. This slight decrease in the photocatalytic activity may be due to slight dissolution of the ZnO nanoparticles or to the desorption of CuPc molecules from ZnO surface. The results indicate a high stability of the synthesized composite nanomaterials.

Figure 10A:
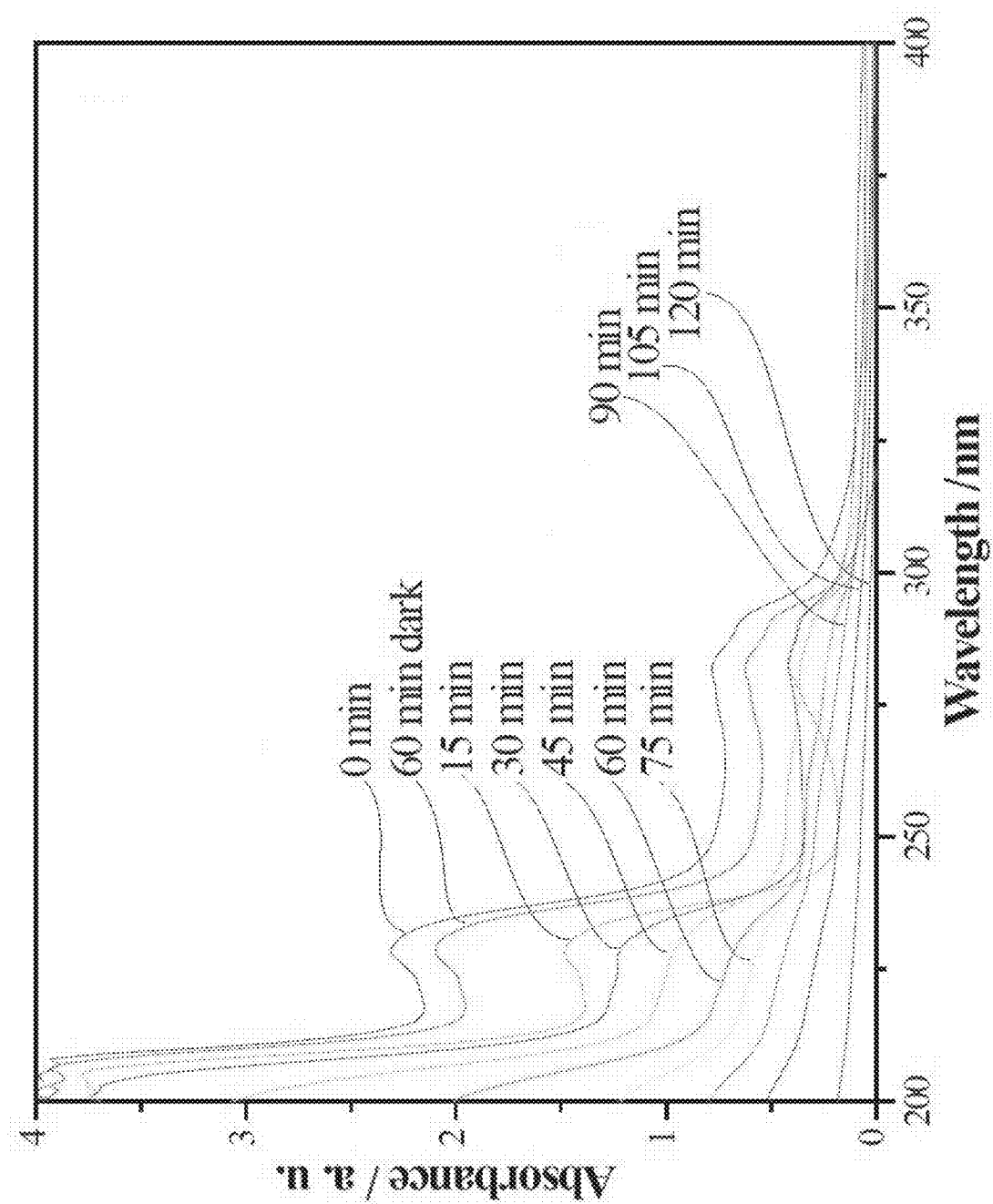
FIG. 10A shows UV-vis absorption spectra of an aqueous solution of 2,4-dichlorophenoxyacetic acid (2,4-D) during solar light irradiation in the presence of an exemplary CuPc-ZnO nanocomposite with $H_2O_2$ at pH 5.
Figure 10B:
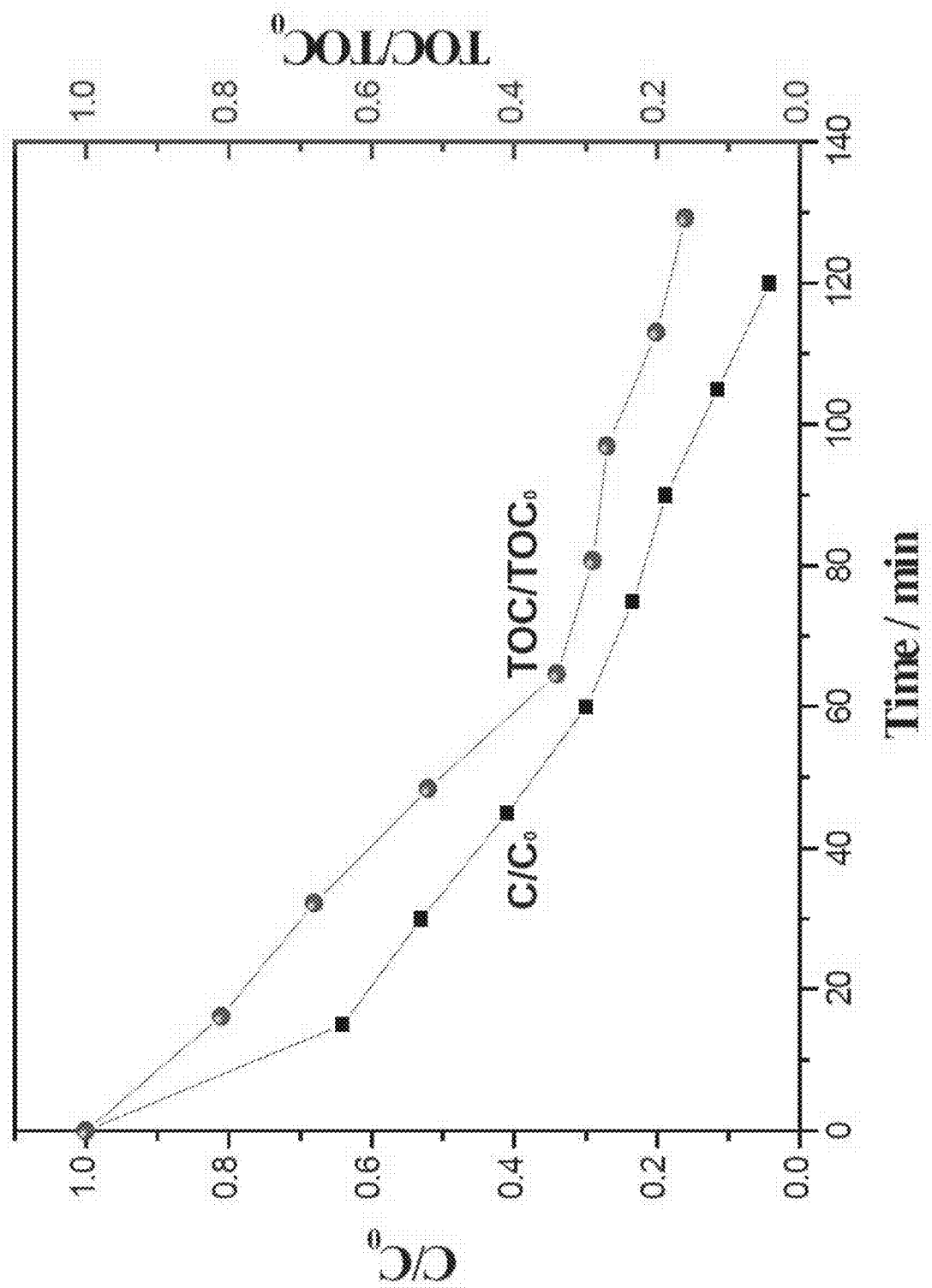
FIG. 10B shows plots based on the UV-vis absorption spectra showing variation of percent concentration based on initial concentration ($C/C_0$) and percent total organic content based on initial total organic content ($TOC/TOC_0$) with irradiation time of an aqueous solution of 2,4-dichlorophenoxyacetic acid (2,4-D) during solar light irradiation in the presence of an exemplary CuPc-ZnO nanocomposite with $H_2O_2$ at pH 5.
Figure 11:
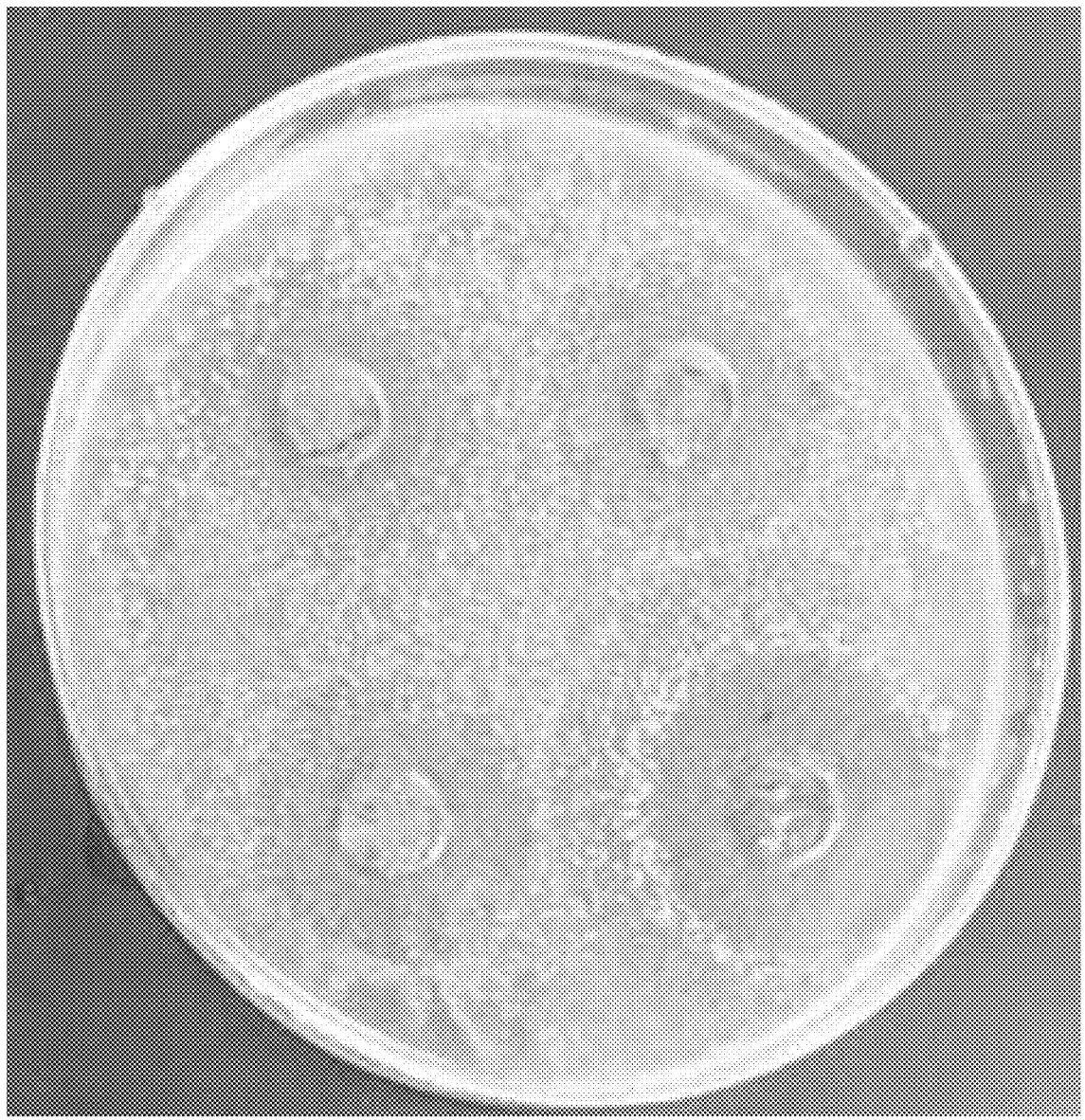
FIG. 11 shows a photograph of semi-solid agar plates exhibiting the effect of an exemplary CuPc-ZnO nanocomposite against *E. coli*.

FIGS. 10A and 10B show UV-vis absorption spectra (FIG. 10A) of an aqueous solution of 2,4-dichlorophenoxyacetic acid (2,4-D) during solar light irradiation in the presence of CuPc-ZnO—$H_2O_2$ at pH 5, alongside plots (FIG. 10B) of the photocatalytic degradation efficiency of 2,4-dichlorophenoxyacetic acid (2,4-D) on the basis of concentration versus initial concentration, $C/C_0$, as well as total organic content versus initial total organic content, $TOC/TOC_0$, with irradiation time at pH 5 in the presence of CuPc-ZnO—$H_2O_2$.

Evaluation of Antibacterial Activity

The inhibitory activity of the CuPc-ZnO composite materials was assessed against multi-drug-resistant (MDR) *E. coli* by agar well diffusion. The presence of a clear zone indicated that the bacteria did not develop resistance toward any of the tested chemical compounds. The maximum inhibitory zone was obtained with an exemplary CuPc-ZnO composite, followed by CuPc, and then pure ZnO. These results indicate that all tested materials are active against MDR *E. coli*.

Cu-Phthalocyanine Sensitized Photocatalytic Mechanism

Figure 12:
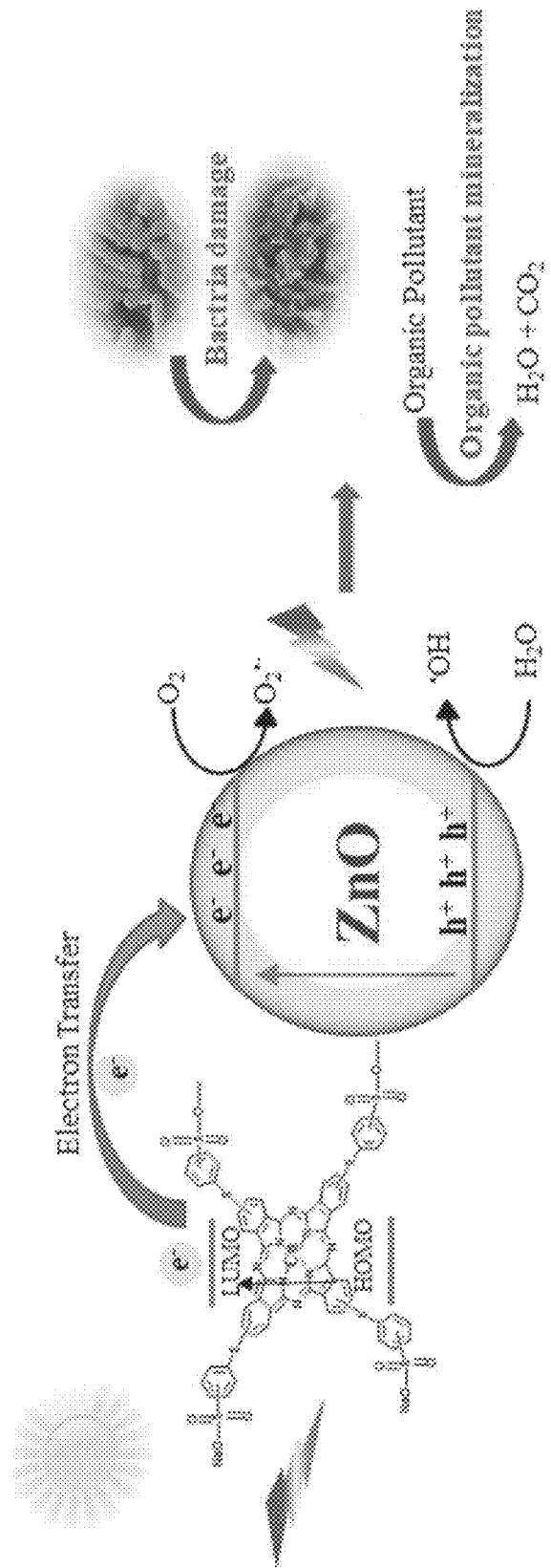
FIG. 12 shows a proposed pictorial mechanism of the sensitized photocatalysis using an exemplary CuPc-ZnO nanocomposite.

The photocatalytic oxidation of pollutants using copper-phthalocyanine sensitized metal oxide photocatalysts, such organic pollutants including Crystal Violet (CV) and 2,4-dichlorophenoxyacetic acid (2,4-D) as well as bacterial damage under solar light irradiation using a CuPc-ZnO composite may proceed as proposed in FIG. 12 and Equations 1 to 7.

$$CuPc + h\nu(Vis) \rightarrow CuPc^* + (e^-) \quad \text{Eq. 1}$$

$$CuPc^*(e^-) + ZnO \rightarrow \cdot CuPc^+ + ZnO(e^-) \quad \text{Eq. 2}$$

$$ZnO + h\nu(UV) \rightarrow ZnO(e^-) + ZnO(h^+) \quad \text{Eq. 3}$$

$$ZnO(e^-) + O_2 \rightarrow ZnO + O_2\cdot^- \quad \text{Eq. 4}$$

$$ZnO(h^+) + H_2O \rightarrow \cdot OH \quad \text{Eq. 5}$$

$$(O_2\cdot^-, \cdot OH) + CV \rightarrow CO_2 + H_2O \quad \text{Eq. 6}$$

$$(O_2\cdot^-, \cdot OH) + Bacteria \rightarrow \text{Damaged Bacteria} \quad \text{Eq. 7}$$

Numerous modifications and variations of the present invention are possible in light of the above teachings. It is therefore to be understood that within the scope of the appended claims, the invention may be practiced otherwise than as specifically described herein.

The invention claimed is:

1. A wastewater purification composition, comprising:
   water
   an organic dye, and
   a photosensitizer composite, comprising:
      tetra(4-thiophenyl)phthalocyaninatocopper(II); and
      ZnO particles,
   wherein the ZnO particles include first spheroid particles and second spheroid particles, wherein the first spheroid particles have an average diameter in a range of from 50 to 450 nm and the second spheroid particles have an average outer diameter in a range of from 0.5 to 5 μm.

2. The wastewater purification composition of claim 1, wherein the tetra(4-thiophenyl)phthalocyaninatocopper(II) is present in an amount of from 2.5 to 15 wt. %, relative to a total weight of the photosensitizer composite.

3. The wastewater purification composition of claim 1, wherein the photosensitizer composite is synthesized hydrothermally.

4. The wastewater purification composition of claim 1, wherein the photosensitizer composite the molar ratio of Cu to Zn is in a range of from 3:1 to 1:3.

5. The wastewater purification composition of claim 1, wherein the photosensitizer composite the first spheroid particles have a sphericity of at least 0.85, and/or are hollow.

6. The wastewater purification composition of claim 1, wherein the photosensitizer composite the second spheroid particles are hollow spheres having a sphericity of at least 0.9, and/or hollow hemispheres, which when extrapolated to spheres, have a sphericity of at least 0.9.

7. The wastewater purification composition of claim 1, wherein the photosensitizer composite the second spheroid particles have nanorods, protruding outwardly, orthogonally to spherical surfaces, and
   wherein the nanorods have an average diameter in a range of from 1 to 250 nm.

* * * * *